(12) United States Patent  
Lee

(10) Patent No.: US 12,105,503 B2  
(45) Date of Patent: Oct. 1, 2024

(54) SYSTEM FOR MONITORING INDUSTRIAL EQUIPMENT THROUGH IoT SENSORS AND AUGMENTED REALITY IMPLEMENTATION

(71) Applicant: HYOSUNG P&M CO., LTD., Seoul (KR)

(72) Inventor: Kyu Won Lee, Seoul (KR)

(73) Assignee: HYOSUNG P&M CO., LTD., Seoul (KR)

( * ) Notice: Subject to any disclaimer, the term of this patent is extended or adjusted under 35 U.S.C. 154(b) by 394 days.

(21) Appl. No.: 17/523,150

(22) Filed: Nov. 10, 2021

(65) Prior Publication Data

US 2022/0382255 A1 Dec. 1, 2022

(30) Foreign Application Priority Data

May 31, 2021 (KR) .................. 10-2021-0070318

(51) Int. Cl.
  *G05B 19/418* (2006.01)
  *G06T 19/00* (2011.01)

(52) U.S. Cl.
  CPC ..... *G05B 19/4185* (2013.01); *G05B 19/4183* (2013.01); *G05B 19/4188* (2013.01); *G06T 19/006* (2013.01)

(58) Field of Classification Search
  CPC ............ G05B 19/4185; G05B 19/4183; G05B 19/4188; G05B 2219/31088; G06T 19/006; H04L 67/10; H04L 67/125; G06Q 30/016; G06Q 10/20; G06Q 30/0281; G06Q 50/10; G01K 1/143; G01M 13/04; G01R 23/16; G01R 31/34; G16Y 40/20
See application file for complete search history.

(56) References Cited

U.S. PATENT DOCUMENTS

| 2016/0283443 | A1* | 9/2016 | Michalscheck .. G05B 19/41875 |
| 2019/0340485 | A1 | 11/2019 | Ngo et al. |
| 2020/0093088 | A1 | 3/2020 | Carta |
| 2020/0175765 | A1* | 6/2020 | McAdam ................ G06F 16/29 |
| 2020/0393521 | A1* | 12/2020 | Bayoumi ............... G01R 31/62 |
| 2021/0110191 | A1* | 4/2021 | Gruteser ................ G06N 3/045 |
| 2021/0255611 | A1* | 8/2021 | McGregor ............. G06T 13/20 |

(Continued)

FOREIGN PATENT DOCUMENTS

| KR | 20150085853 A | 7/2015 |
| KR | 20170043164 A | 4/2017 |

(Continued)

*Primary Examiner* — Thomas C Lee
*Assistant Examiner* — Tyler Dean Hedrick
(74) *Attorney, Agent, or Firm* — Polsinelli PC

(57) ABSTRACT

An embodiment of the present disclosure may provide an Internet-of-Things (IoT) sensor attached to the surface of industrial equipment to acquire data, the IoT sensor including: a first substrate; a first connector electrically connected to the first substrate and attached to the surface of the first substrate to transfer a measurement signal of the sensor; a cable formed of a flexible conductive wire and having one end connected to the first connector; a second connector connected to the other end of the cable and configured to receive the measurement signal of the sensor; and a communication module attached to a second substrate connected to the second connector.

19 Claims, 27 Drawing Sheets

(56) References Cited

U.S. PATENT DOCUMENTS

2022/0155744 A1* 5/2022 Zimmerman ...... G05B 19/0423
2022/0373407 A1* 11/2022 Ni ......................... H05K 1/181

FOREIGN PATENT DOCUMENTS

| KR | 10-2104326 B1 | 4/2020 |
|----|---------------|--------|
| KR | 10-2020-0069487 A | 6/2020 |
| KR | 10-2238193 B1 | 4/2021 |

* cited by examiner

| Home | Monitoring | Menu |

Department : A

Site information:
Place of Business, Suwon

| Monitoring pump | Temperature sensor | Vibration sensor |
|---|---|---|
| 900 | 300 | 300 |

| No. | Pump Type | Pump | |
| --- | --- | --- | --- |
|     |           | Temp. | Vib. |
| 1 | HP-1 | 35° | 25 mm/s |
| 2 | HP-1 | 30° | 25 mm/s |
| 3 | HP-1 | 35° | 25 mm/s |
| 4 | HP-1 | 30° | 25 mm/s |
| 5 | HP-1 | 35° | 25 mm/s |
| 6 | HP-2 | 30° | 25 mm/s |
| 7 | HP-2 | 35° | 25 mm/s |
| 8 | HP-2 | 30° | 25 mm/s |
| 9 | HP-2 | 35° | 25 mm/s |
|   |      |     |         |

800-7

1200

SYSTEM FOR MONITORING INDUSTRIAL EQUIPMENT THROUGH IoT SENSORS AND AUGMENTED REALITY IMPLEMENTATION

CROSS REFERENCE TO RELATED APPLICATION

This application claims priority from Republic of Korea Patent Application No. 10-2021-0070318, filed on May 31, 2021, which is hereby incorporated by reference in its entirety.

BACKGROUND

1. Field of Technology

The present embodiment relates to a system capable of remotely monitoring the real-time status of industrial equipment through disposition of IoT sensors and implementation of augmented reality and, more specifically, to a system capable of acquiring equipment data in real time through IoT sensors disposed on industrial equipment, recognizing the type of the industrial equipment, and displaying a three-dimensional simulation image corresponding thereto, thereby implementing augmented reality.

2. Description of the Prior Art

According to the prior art, if industrial equipment (for example, a pump or a motor) malfunctions, an expert needs to visit the site and diagnose the cause of malfunction. Therefore, it is impossible to manage the cause of malfunction in real time, and no instant countermeasure can be taken. This has a problem in that aging of the equipment is accelerated, and repair/maintenance cannot be performed at an appropriate time.

In addition, inexperienced personnel determine whether industrial equipment is normal or not and deal therewith on conventional industrial sites. This has a problem in that it is impossible to accurately determine the configuration of various kinds of equipment, and no one can accurately determine the cause of malfunction of equipment, except for experienced technicians.

As disclosed in Korean Registered Patent Publication No. 10-2238193, conventional augmented reality-based mobile devices and servers display specific information on live videos, but have restrictions on accurately specifying individual positions and sizes of industrial equipment and displaying simulation videos.

In addition, IoT sensors used for industrial equipment have limited data necessary for industrial processes, as disclosed in Korean Patent Publication No. 10-2020-0069487 A, and used sensors are also limited according to process characteristics. A gas detection sensor is used in Korean Patent Publication No. 10-2020-0069487 A, but the same cannot be replaced with a different kind of sensor.

In addition, sensors attached to industrial equipment need to have compact sizes so as to minimize the influence on operations of industrial equipment. For example, the mass center of industrial equipment or the resonance frequency thereof may be changed depending on the sensor size, thereby affecting the lifespan of the industrial equipment and the reliability of measurement data.

In addition, IoT sensors used for industrial equipment are commonly attached to the surface of industrial equipment and thus may be affected by characteristics of external environments. For example, moisture may flow into sensors under the influence of a high-temperature or high-humidity environment or other type of atmospheric environment (for example, rain), thereby degrading the durability of the sensor or reducing the accuracy of measured data.

In addition, IoT sensors include various kinds of electronic components, and periodic maintenance and component replacement are accordingly scheduled. From this point of view, IoT sensors need to have a structure appropriate for maintenance/repair.

SUMMARY OF THE INVENTION

In view of the above-mentioned background, it is an aspect of the present embodiment to provide a technology capable of implementing IoT (Internet of Things) by wireless sensors attached industrial equipment, and recognizing the status of the industrial equipment in real time through a monitoring system configured to manage sensing data in real time.

In view of the above-mentioned background, it is another aspect of the present embodiment to provide a technology capable of implementing AR (Augmented Reality) or MR (Mixed Reality) on a smartphone screen such that malfunction problems of industrial equipment can be solved more quickly, and capable of displaying information regarding the industrial equipment to users through three-dimensional modeling.

It is another aspect of the present embodiment to provide an IoT sensor configured such that various kinds of sensors can be selectively attached/detached according to the type of an industrial process and the type of equipment necessary for the industrial process.

It is another aspect of the present embodiment to provide a structure capable of minimizing internal and external influences on industrial equipment and minimizing the sensor size, and an IoT sensor including the same.

It is another aspect of the present embodiment to provide a sensor structure capable of preventing erroneous operations of a sensor during a process of component replacement or repair of industrial equipment, and improving durability of the sensor, and an IoT sensor including the same.

It is another aspect of the present embodiment to provide an IoT sensor tailored to a special type of industrial equipment (for example, a pump) such that more accurate data acquisition and transmission/reception are possible.

In accordance with an aspect, a first embodiment may provide an IoT sensor attached to a surface of industrial equipment so as to acquire data, the IoT sensor including: a first substrate; a first connector electrically connected to the first substrate and attached to a surface of the first substrate to transfer a measurement signal of the sensor; a cable formed of a flexible conductive wire and having one end connected to the first connector; a second connector connected to another end of the cable and configured to receive the measurement signal of the sensor; and a communication module attached to a second substrate connected to the second connector.

The IoT sensor may further include a measurement unit case configured to protect the first substrate and the first connector, and the measurement unit case may include: a body including a vertical structure configured to support the first substrate; and a cover detachably coupled to the body.

In connection with the IoT sensor, a groove formed in the body and a groove formed in the cover may correspond to each other in shape so as to be brought into contact with each other, and a silicon-type packing rubber may be inserted into a space between the body and the cover to seal the space.

The IoT sensor may further include a vibration sensor disposed on the first substrate so as to acquire vibration data.

The IoT sensor may further include a temperature sensor attached to another surface of the first substrate, on which the first connector is not disposed.

In connection with the IoT sensor, the temperature sensor may be connected to a metal line which is attached to the surface of the first substrate by soldering.

In connection with the IoT sensor, the temperature sensor may be connected to a metal line detachably coupled to the surface of the first substrate.

In connection with the IoT sensor, the body may further include a magnetic structure having magnetism.

In connection with the IoT sensor, the cable may include multiple detachable sub-cables.

The IoT sensor may further include a communication unit case configured to protect the second substrate and the second connector, and the communication unit case may include: a third substrate placed on a plane different from that of the second substrate; and a cover detachably coupled to the third substrate.

The IoT sensor may further include: a battery disposed on one surface of the third substrate and configured to supply power to the communication module disposed on the second substrate; and a magnetic structure attached to another surface of the third substrate.

In accordance with an aspect, a second embodiment may provide a method for providing information about industrial equipment on the basis of augmented reality, the method including: a step in which a server receives image data of the equipment or data about an identifier attached to the equipment sensed by a camera included in a user's terminal; a step in which the server compares the data about the identifier with a list about types of multiple pieces of equipment, stored in the server, to determine the type of the equipment; a step in which the server generates three-dimensional video data corresponding to the type of the equipment; and a step in which the server transfers the three-dimensional video data to the user's terminal, wherein the three-dimensional video data of the equipment includes information about the shape and the size of the equipment.

In accordance with an aspect, a third embodiment may provide a system for providing information of equipment on the basis of augmented reality, the system including: a mobile device configured to acquire an image of the equipment through a camera, the mobile device being configured to identify an identifier attached to the equipment or receive information regarding a three-dimensional shape of the equipment; and a server configured to receive the identifier or measurement data regarding the shape of the equipment from the mobile device, wherein the server includes a processor provided inside the server and configured to compute the measurement data and to generate data for implementing augmented reality, and wherein the processor generates three-dimensional video data to display a three-dimensional virtual image of the equipment on the mobile device, and transmits the three-dimensional video data to the mobile device, thereby implementing augmented reality.

As described above, the present embodiment may provide an IoT sensor including multiple cables and attachable/detachable cables such that the same is optimized according to the type of industrial equipment and the type of measured data, and a data measurement system including the same.

According to the present embodiment, packing rubber cable of improving the airtightness of a sensor measurement unit may be included so as to improve the waterproofing function and dustproofing function of the measurement unit, and the influence of external environment (for example, moisture inflow or dust inflow) may be minimized.

According to the present embodiment, the internal structure of a sensor may be disposed appropriately so as to minimize electric interference between respective elements and to minimize the sensor size.

The present embodiment may provide a sensor configured such that, even if sensor inspection and component replacement are repeatedly performed, durability is not degraded, and recoupling is easy.

The present embodiment may provide a sensor having a magnetic structure, the position of which is changed from the outside to the inside, and having an optimally designed relation of coupling with other components such that the same can endure external impacts and damage.

According to the present embodiment, a QR code attached to a product may be recognized to accurately determine the product type, and virtual three-dimensional design corresponding to actual equipment and detailed element information may be displayed on a mobile device.

According to the present embodiment, data may be transmitted/received in real time from a wireless sensor attached to a product, existence of an abnormal condition of equipment may be determined, and a corresponding alarm may be transmitted to the user.

BRIEF DESCRIPTION OF THE DRAWINGS

FIG. 10 is a fifth exemplary view illustrating an application driving screen of a mobile device according to an embodiment;

DETAILED DESCRIPTION OF THE EXEMPLARY EMBODIMENTS

Figure 1:
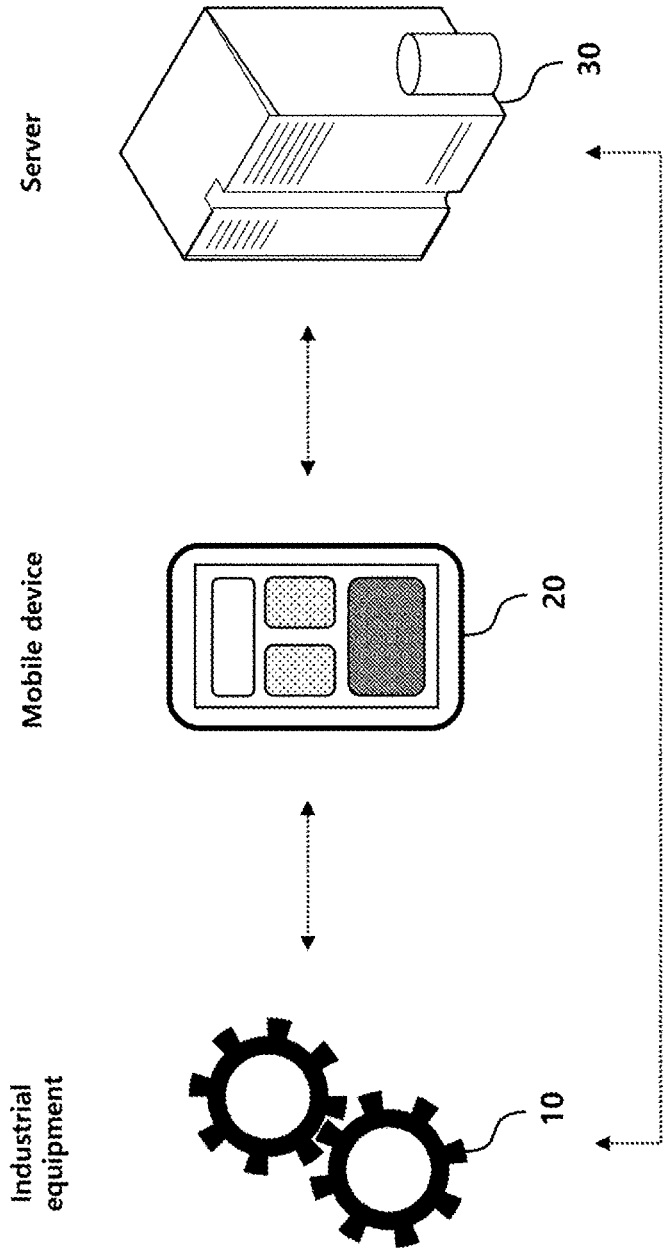
FIG. 1 illustrates data flow between industrial equipment, a mobile device, and a server according to an embodiment.

FIG. 1 illustrates data flow between industrial equipment, a mobile device, and a server according to an embodiment.

Referring to FIG. 1, an augmented reality-based platform may include industrial equipment 10, a mobile device 20, a server 30, etc.

The industrial equipment 10 may include a pump, a motor, etc., but in the case of mechanical equipment included in an industrial plant, the type thereof is not limited.

The industrial equipment 10 may include sensors capable of measuring the state of the industrial equipment, such as a temperature sensor, a vibration sensor, a flow sensor, a power sensor, etc., and may transmit/receive data to/from the mobile device 20 or the server 30 through Long Range (LoRa) wireless communication, Wireless Fidelity (Wi-Fi) wireless communication, etc. by using a wireless sensor. Each of the sensors may be defined as Internet-of-Things (IoT) sensor.

The mobile device 20 may include a smartphone, a tablet computer, a notebook computer, a wearable device, a digital camera, etc., but may include a computer-based web as necessary. The type thereof is not limited.

The mobile device 20 may include a display, a camera, etc., and thus may measure image data or distance data about the exterior or shape of the industrial equipment and may transfer the same to the server 30 to transmit/receive data for augmented reality (AR) implementation.

Augmented reality (AR) may imply a technology of showing one video by superposing a virtual information object on a real image or background on a screen of a mobile device, and the mobile device 20 or the server 30 may independently or integrally process data about a real image or background and data about a virtual information object as necessary, and may display the same in the mobile device 20.

The server 30 may include a physical computing server, a web server, a database server, etc., and may be a cloud server or the like for implementing a virtual network environment. The server 30 is not limited thereto.

The server 30 may be divided into a server (not shown) for three-dimensional modeling, a server (not shown) for implementing augmented reality, a server (not shown) for IoT monitoring, a server (not shown) for remote control, etc. on the basis of a role or an operation.

The server 30 may include a communication interface (not shown), a processor (not shown), a memory (not shown), etc., and may additionally include other elements.

As necessary, the server 30 may be implemented while being embedded in the mobile device 20. The above-described functions may be implemented through a storage device or a processor embedded in the mobile device 20.

When the server 30 is implemented outside the mobile device 20, the server 30 may be distinguished from an information processing device inside the mobile device 20.

The server 30 may be divided into a first server and a second server according to its function and operation.

Figure 2:
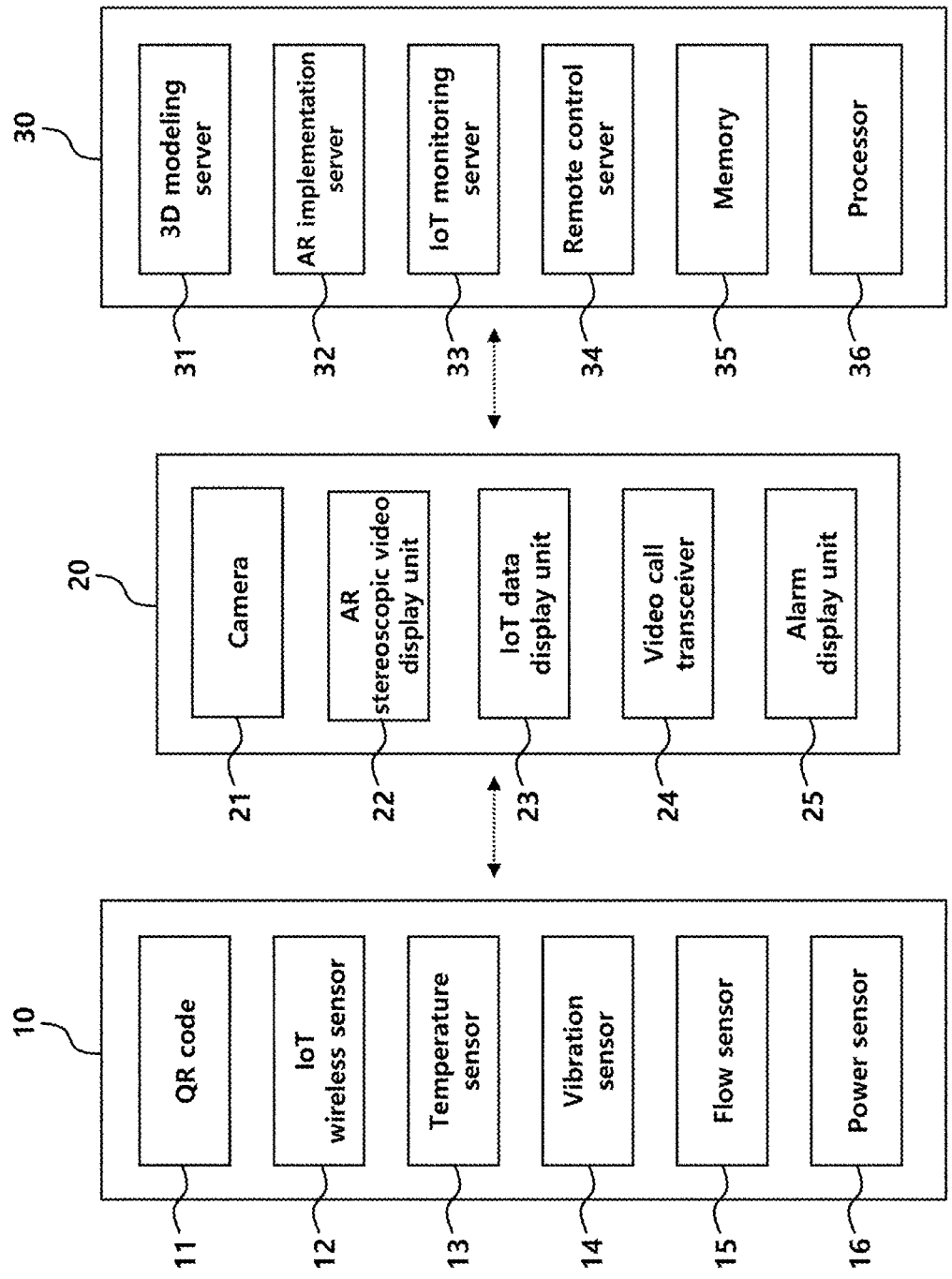
FIG. 2 is a view illustrating elements of industrial equipment, a mobile device, and a server according to an embodiment.

FIG. 2 is a view illustrating elements of industrial equipment, a mobile device, and a server according to an embodiment.

Referring to FIG. 2, an augmented reality-based platform may include industrial equipment 10, a mobile device 20, a server 30, etc., and each element may further include sub-elements.

The industrial equipment 10 may include a QR code 11, an IoT wireless sensor 12, a temperature sensor 13, a vibration sensor 14, a flow sensor 15, a power sensor 16, etc.

The industrial equipment 10 may include information about the specification, type, etc. of the industrial equipment by including various types of identifiers such as a quick response code or a bar code. The identifiers are not limited to the QR code and the bar code if the same can include information about the industrial equipment 10.

The QR code 11 may be formed by forming a predetermined black and white pattern in a rectangular region, and a camera of the mobile device 20 may recognize the QR code 11. Data including information about the QR code 11 acquired by the mobile device 20 may be transmitted to the server 30, and may be compared with information about pieces of industrial equipment stored in the server 30, thereby specifying the type of the industrial equipment 10.

A numeral in the QR code 11 may be a value defined as a single-digit numeral or a double-digit numeral, and QR code information may be used to inquire information about pieces of industrial equipment in the server. The information about pieces of industrial equipment, which is inquired in the server through the QR code 11, may be displayed on a screen of the mobile device 20.

The IoT wireless sensor 12 may be called a wireless sensor for implementing Internet of Things (IoT), and the type thereof is not limited if the same can wirelessly communicate with the mobile device 20 or the server 30. For example, the IoT wireless sensor 12 may be a sensor allowing Long Range (LoRa) wireless communication, or a sensor allowing Wireless Fidelity (Wi-Fi) wireless communication. In another example, wireless communication may be cellular communication such as Long Term Evolution (LTE), Code Division Multiple Access (CDMA), Universal Mobile Telecommunications System (UMTS), or Wireless Broadband (WiBro), and may be wireless communication such as Bluetooth, Near Field Communication (NFC), or Radio Frequency.

The IoT wireless sensor 12 may be installed in various positions or various elements such as a rotor, a vibrator, a compressor, a bearing, a fan, etc. of a motor or a pump, and may wirelessly communicate with a network server.

The IoT wireless sensor 12 may adopt a TCP/IP socket communication method including a server socket or a client socket to transmit information about pieces of industrial equipment to the server.

The IoT wireless sensor 12 may include a measurement unit (not shown), a signal transfer line (not shown), a processor (not shown), and a communication unit (not shown), and may be implemented by integrating functions of various sensors. The measurement unit (not shown) may include a magnet, and thus may be attached to a predetermined portion of the industrial equipment to measure the physical characteristics of the industrial equipment in real time. A signal measured by the measurement unit (not shown) may be transferred to an internal processor (not shown) and the communication unit (not shown) through the signal transfer line (not shown). The communication unit (not shown) may communicate with the server or the mobile device by using the above-described wireless communication method.

The IoT sensor may adopt a wireless communication method to transmit or receive temperature data or vibration data, but may adopt a wired communication method or a mixed method thereof to transmit or receive each type of data.

The temperature sensor 13 may be a sensor for measuring the inside temperature or outside temperature of industrial equipment, for example, a pump or a motor, and the IoT wireless sensor 12 may transmit, for real-time monitoring, temperature data of the equipment to the server 30. For example, the temperature sensor 13 may measure the temperature of an equipment surface.

The vibration sensor 14 may be a sensor for measuring the inside vibration or outside vibration of industrial equipment, for example, a pump or a motor, and the IoT wireless sensor 12 may transmit, for real-time monitoring, vibration data of the equipment to the server 30. For example, the vibration sensor 14 may measure acceleration (m/s2) in a direction which is defined as an x-axis, a y-axis, or a z-axis, and a method for vibration expression may be variously defined as 0.5G, 1G, 2G, etc. In another example, the range of acceleration measured by the vibration sensor 14 may be 2.5 m/s2 to 156 m/s2, but is not limited thereto.

The flow sensor 15 may be a sensor for measuring the amount of a fluid flowing at one end of or inside industrial equipment, for example, a pump or a motor, and the IoT wireless sensor 12 may transfer, for real-time monitoring, flow rate data of the equipment to the server 30.

The power sensor 16 may be a sensor for measuring power consumed by industrial equipment, for example, a pump or a motor, and the IoT wireless sensor 12 may transmit, for real-time monitoring, power data of the equipment to the server 30.

The above-described sensors may be installed on the surface of the industrial equipment, but may be installed in all or some of inner elements of the industrial equipment to measure and store changes in inside physical characteristics and may transmit the changes to the mobile device 20, or the server 30.

The mobile device 20 may include a camera 21, an augmented reality stereoscopic display unit 22, an IoT data display unit 23, a video call transceiver 24, an alarm display unit 25, etc.

The mobile device 20 may convert text data or video data through a display panel (not shown) and may display the converted text data or video data on a screen. Further, the mobile device 20 may receive a touch input of a user through a touch panel (not shown) and may transmit or receive touch data to or from the server 30.

The camera 21 may measure a subject to acquire and process two-dimensional video data of the subject, distance data, or three-dimensional data obtained by a combination thereof. The camera 21 may be defined so as to include a light output unit for light transmission, an image sensor for measuring reflected light, etc. A video or an image of the equipment measured by the camera 21 may be defined as an actual measured video or an actual measured image.

The imaging angle, size, and region of the camera 21 may be adjusted such that a real image of the industrial equipment corresponds to a virtual image implemented through three-dimensional modeling in terms of each position. The imaging angle, size, and region of the camera 21 may be implemented by moving the mobile device by the user, or may be implemented through separate functions in the mobile device.

The augmented reality stereoscopic display unit 22 may be a separate region distinguished from a screen for displaying a real video of a subject measured by the camera. In another example, the augmented reality stereoscopic display unit 22 may imply a virtual screen or an object video superposed and displayed on the screen for displaying a real video of a subject. A stereoscopic video displayed on the augmented reality stereoscopic display unit 22 may refer to a real image group which forms a separate cluster separated from a real image, or may refer to all or a part of the real image and the virtual image group.

The augmented reality stereoscopic display unit 22 may be implemented in the form in drawings, described later, but is not limited thereto.

The IoT data display unit 23 may be a region for displaying measured data of the equipment device, which is managed by the server, and may be a region for displaying measured data directly received a sensor of the industrial equipment.

The IoT data display unit 23 may be implemented in the form in drawings, described later, but is not limited thereto.

The video call transceiver 24 may be a region for displaying the process of a voice call or a video call performed between a user and a manager. The server 30 may determine attendance of a user, and may implement a remote connection system such that communication is performed between the user and the manager only when a one-to-on conversation is possible. The server 30 may process data about whether to make a connection such that some participants remain in a standby state when there are at least two participants. The technical video call transceiver 24 may perform remote connection only when communication between the user and a technician is performed, thereby displaying the process of a voice call or a video call.

The video call transceiver 24 may share, in order to provide a non-face-to-face remote technical assistance, a photograph or a video of the industrial equipment 10 which a user has measured using the mobile device 20 of the user, and may provide a drawing function of drawing a picture by a screen touch at a position in the equipment, in which abnormality exists.

The alarm display unit 25 may be a region for providing an alarm function when measured data obtained by measuring the temperature, vibration, flow rate, and power state of the industrial equipment 10 exceeds a threshold.

The server 30 may configure the threshold, and when measured data measured every hour exceeds the threshold, may generate alarm data and transfer the generated alarm data to the mobile device 20.

An alarm region of the alarm display unit 25 may be formed so as to have display regions in which individual alarms are divided and have display regions sequentially provided in vertical or horizontal direction.

The server 30 may include a three-dimensional modeling server 31, an augmented reality implementation server 32, an IoT monitoring server 33, a remote control server 34, a memory 35, a processor 36, etc.

The three-dimensional modeling server 31 may determine the specification of industrial equipment through simulation, and may virtually implement the shape of the industrial equipment through three-dimensional simulation. In this case, an optimal layout suitable for conditions of an industrial site may be provided. If necessary, the three-dimensional modeling server 31 may use three-dimensional simulation data regarding each model of equipment, which is stored in the memory 35.

The augmented reality implementation server 32 may implement augmented reality by combining actual measured data regarding the shape, size, image, etc. of the industrial equipment 10 measured by the mobile device 20 and three-dimensional modeling data. The augmented reality implementation server 32 may separately manage/process the actual measured data and the three-dimensional modeling data, and may separately generate matching data corresponding to a specific position of the equipment to implement augmented reality.

The IoT monitoring server 33 may receive data regarding the state of the industrial equipment 10, and may store the same to the server or may perform calculation. The IoT monitoring server 33 may configure a threshold as necessary to issue an alarm, or may issue an alarm when the data is included in a predetermined reference region or a reference range. The threshold, the reference region, and the reference range may be differently defined depending the type and state of the industrial equipment 10, the mobile device 20, and the server 30.

The user can adjust preventive maintenance timing through alarm data which the IoT monitoring server 33 transfers to the mobile device 20. Further, the equipment as a whole can maintain an optimum state through real-time monitoring. Further, the quality deterioration can be prevented by monitoring various factors through real-time monitoring, and thus production efficiency can be increased.

The IoT monitoring server 33 may adopt a TCP/IP socket communication method including a server socket and a client socket to transmit information about pieces of industrial equipment to the server. The server socket may wait for a connection request from the client socket, and, when the connection request is made, may be connected to the client socket to form another socket. The client socket may send a connection request or transmit data to a server program.

The IoT monitoring server 33 may include a gateway server, and may periodically communicate with the IoT wireless sensor 12 to receive data measured by the above-described sensors 13, 14, 15, and 16 and store the same therein. The IoT monitoring server 33 may bring data collected by a TCP socket method, and may store the same in a database.

The IoT monitoring server 33 may determine, through http communication, whether there is data to be transferred from the IoT wireless sensor 12 in each predetermined period, for example, once every minute. A step of identifying a response of the IoT wireless sensor 12 while communicating with the IoT wireless sensor 12 through the http communication may be further included.

The IoT monitoring server 33 may be configured to be divided into a monitoring server and an IoT server in order to conveniently manage data. The monitoring server may preconfigure a threshold for alarm issuance, may request the IoT server for data in an http manner, and may receive the data to determine whether an alarm is issued. The monitoring server may issue an alarm when measurement values of sensors, received through the IoT server, exceed the threshold and may release the alarm when normal data equal to or smaller than a threshold is received.

The memory 35 may include volatile memory and/or non-volatile memory, and may store software, computer programs, a specification or measured data of industrial equipment, etc. as necessary.

The memory 35 may be included in the above-described server 31, 32, 33, or 34, but may imply a separately formed database.

The memory 35 may receive data, measured by each of the sensors 13, 14, 15, and 16, through the IoT wireless sensor 12, may store sensor data, and may sort and store data while matching the data with the type of industrial equipment to construct an inner database.

The processor 36 may include a central processing unit (CPU), an application processor (AP), etc., and may control the industrial equipment 10 or the mobile device 20, or may perform data calculation/processing.

An IoT according to an embodiment may have a connection structure between a wireless Internet, a central receiver, a server, and a mobile device, but is not limited thereto.

Figure 3:
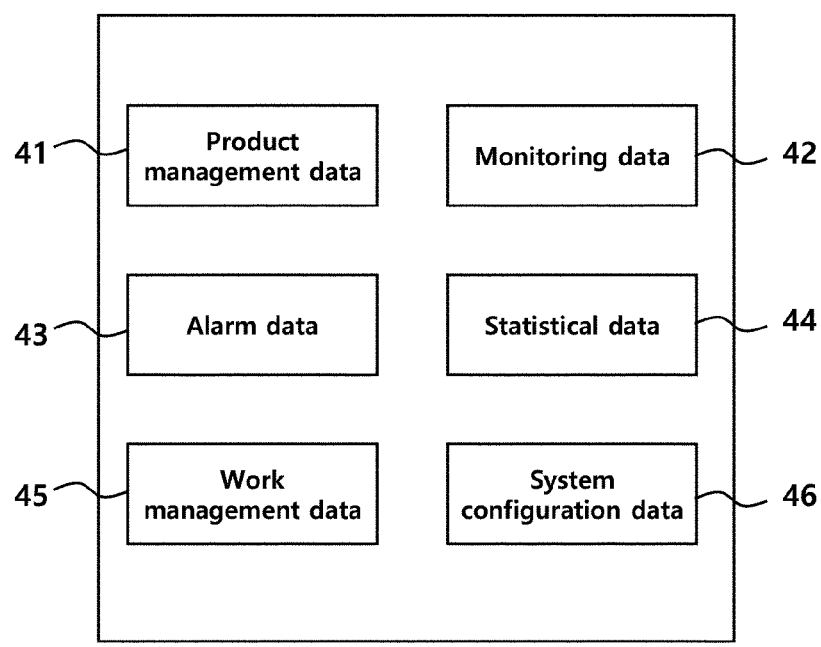
FIG. 3 is a view illustrating the type of data managed by a manager of a server according to an embodiment.

FIG. 3 is a view illustrating the type of data managed by a manager of a server according to an embodiment.

Referring to FIG. 3, data managed by a server manager may include product management data 41, monitoring data 42, alarm data 43, statistical data 44, work management data 45, system configuration data 46, etc.

The product management data 41 may include information about the specification (Spec) of a product, the type of a product, a serial number of a product, a management number of a product, etc. For example, the product management data 41 may include information about the flow rate of a pump, the component-specific size of a pump, an output voltage of a pump, a driving current thereof, etc.

The monitoring data 42 may include data measured by sensors of equipment, and may include data sorted or classified for each user. If necessary, the server may manage data so as to determine the current status of data of all users.

The alarm data 43 may be data that is generated to be transferred to a user terminal when the monitoring data 42 exceeds a threshold or is outside a reference range. The alarm data 43 may include information about the type or time of data, exceeding the threshold or departing from the reference range, in order to manage the history of each alarm.

The statistical data 44 may include information statistically indicating a defect of a product, the history of alarm issuance, the number of times a user accesses an augmented reality system, or supply performance.

The work management data 45 may include information about contents of communication or conversation between a user and a manager, information about the history of access to an augmented reality manual, information about a daily work task logbook, etc.

The system configuration data 46 may include information which the user uses to manage a platform, such as user access authority, the content of management of categories into which individual functions are classified, and the content of configuration of an application.

Figure 4:
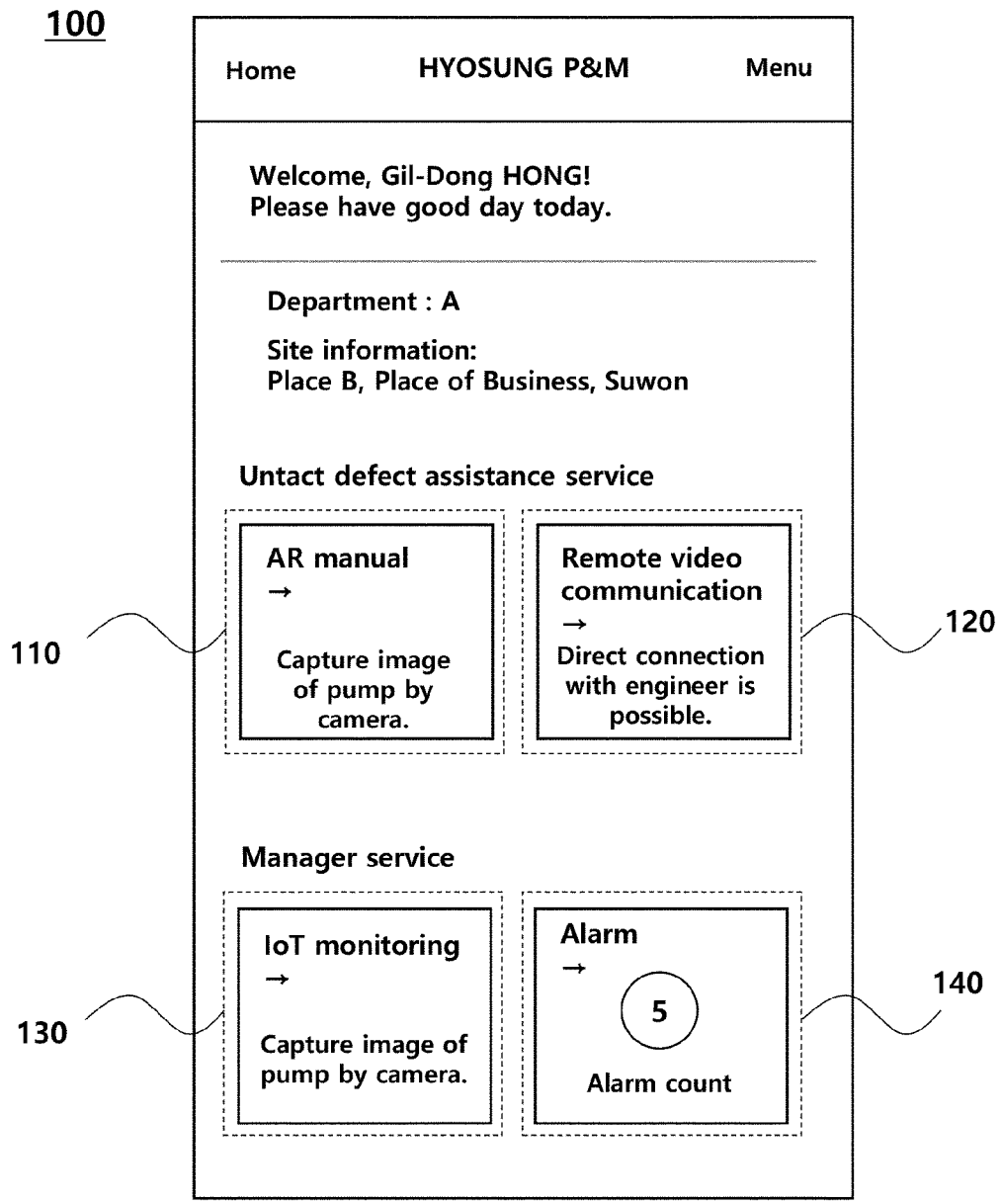
FIG. 4 is a first exemplary view illustrating an application driving screen of a mobile device according to an embodiment.

FIG. 4 is a first exemplary view illustrating an application driving screen of a mobile device according to an embodiment.

Referring to FIG. 4, a screen 100 of a mobile device may include a first region 110, a second region 120, a third region 130, a fourth region 140, etc.

The first region 110 may be a menu for implementing augmented reality. When a user touches the first region 110 of the mobile device, an algorithm for implementing augmented reality may be executed.

The second region 120 may be a menu for a video call or a voice call between a user and a manager. When the user touches the second region 120 of the mobile device, an algorithm for the video call or the voice call may be executed.

The third region 130 may be a menu for IoT monitoring. When the user touches the third region 130 of the mobile device, an algorithm for monitoring the state of equipment may be executed.

The fourth region 140 may be a menu for displaying an alarm issued in the process of monitoring the state of the equipment. When the user touches the fourth region 140 of the mobile device, an algorithm for displaying the alarm may be executed.

The first region to the fourth region 110, 120, 130, and 140 may be defined as rectangular regions which do not overlap each other, but are not limited thereto if the same has a shape capable of separately receiving touch inputs of the user.

Figure 5:
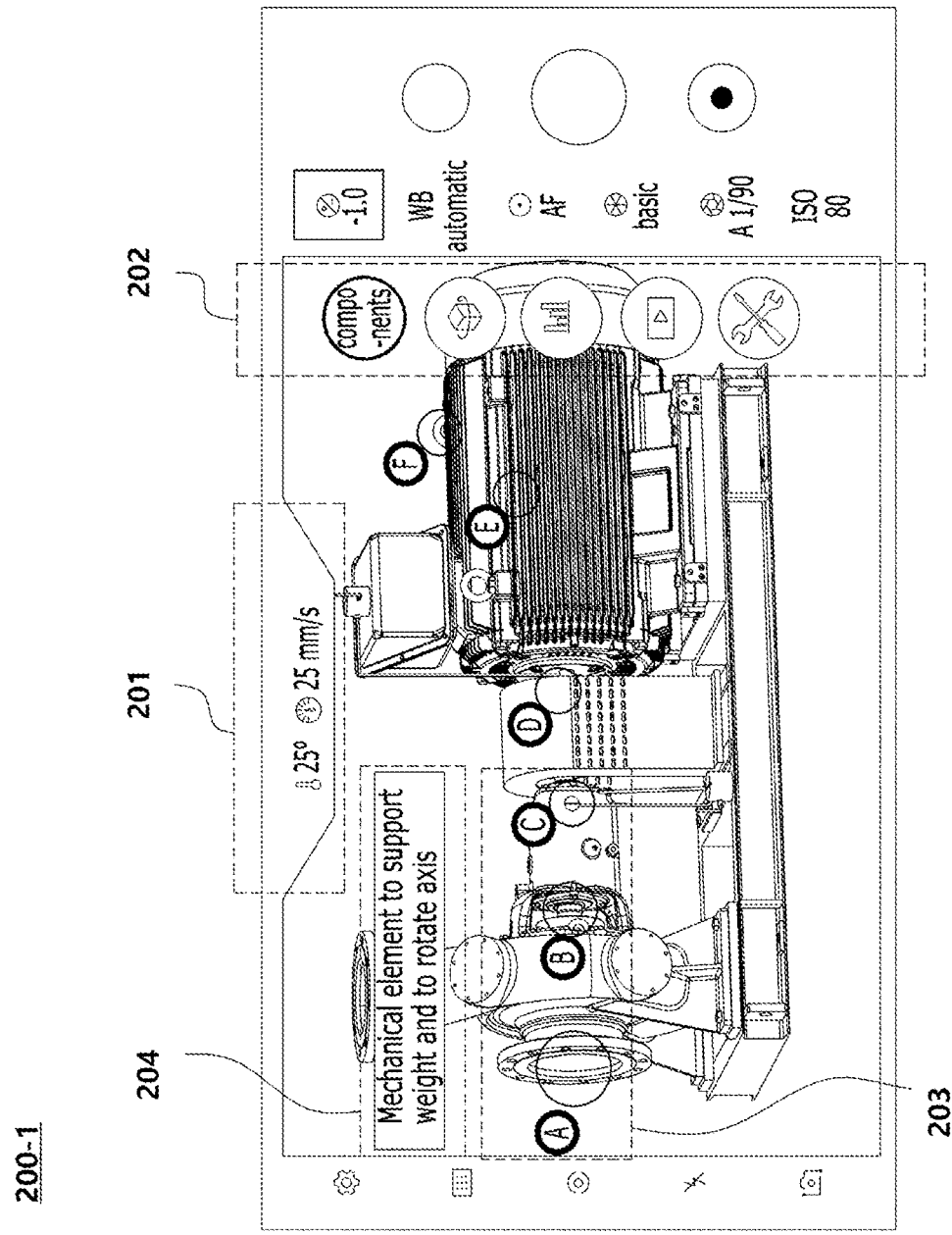
FIG. 5 is a second exemplary view illustrating an application driving screen of a mobile device according to an embodiment.

FIG. 5 is a second exemplary view illustrating an application driving screen of a mobile device according to an embodiment.

Referring to FIG. 5, a screen 200-1 of a mobile device may include an equipment state display region 201, a menu region 202, an element region 203, an element detailed-description region 204, etc.

The equipment state display region 201 may be a region for displaying measured data of industrial equipment, for example, temperature data, vibration data, flow rate data.

The menu region 202 may include an element display menu, a three-dimensional measurement menu, an animation execution menu, a moving-image execution menu, etc., and may be disposed at the right surface of a display screen.

The element region 203 is a region of separately displaying regions of the industrial equipment, and may display each element on a measurement screen or may display each element on a virtual simulation screen. When the element display menu is touched in the menu region 202, elements may be automatically specified and displayed as separate identification indications A, B, C, D, E, and F. Information about an element displayed in the element region 203 may be information received from a server (not shown), or may be information stored in a mobile device (not shown).

When a partial region of the element region 203 is displayed as a point, the element detailed-description region 204 may be a region that is output only when the point is clicked. The element detailed-description region 204 may include text information describing a detailed specification or function of an element.

Figure 6:
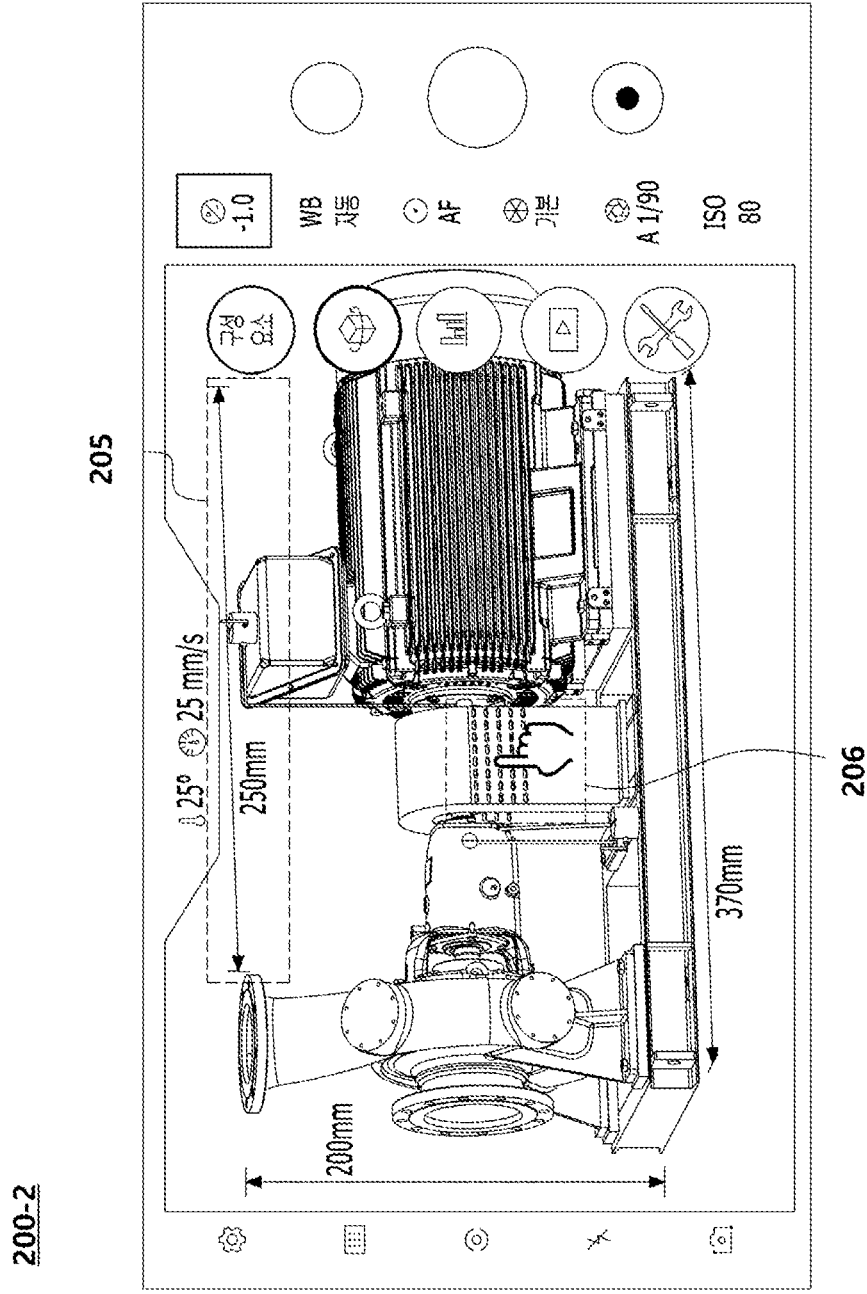
FIG. 6 is a third exemplary view illustrating an application driving screen of a mobile device according to an embodiment.

FIG. 6 is a third exemplary view illustrating an application driving screen of a mobile device according to an embodiment.

A screen 200-2 of a mobile device may include a three-dimensional measurement region 205, a drag-and-drop region 206, etc.

When a three-dimensional measurement menu is selected in a menu region (not shown), the screen 200-2 of the mobile device may be displayed.

The three-dimensional measurement region 205 may measure and display a numerical value of an actual product of industrial equipment recognized through a camera of the mobile device, or may display a numerical value of a product through a virtual simulation model implemented through augmented reality.

The drag-and-drop region 206 may be a region implemented such that the position of a product, implemented through virtual simulation, on a screen can be moved through drag and drop. In another example, when elements of a product are divided for the region of each screen, the position of each element on a screen may be moved through drag and drop.

The drag-and-drop region 206 may be used by defining x, y, and z coordinates in a three-dimensional space for three-dimensional modeling, and may be used by defining x and y coordinates in a two-dimensional touch region of a mobile device region (which is defined separately from three-dimensional coordinates for three-dimensional modeling). The x and y coordinates in the two-dimensional touch region, which have been input through a screen touch of a user, may be updated for each frame, and the x and y coordinates updated based on a time interval of a defined frame may be acquired.

A changed value of the touch coordinates (x and y coordinates) acquired by the mobile device in the drag-and-drop region 206 may be calculated by a server (not shown), and may be matched with x, y, and z coordinates in a three-dimensional space of industrial equipment, implemented by 3D modeling, thereby moving a virtual stereoscopic shape. The changed touch coordinates (x, y) may be matched with two coordinates among x, y, and z coordinates of a stereoscopic shape implemented by 3D modeling, and thus the x, y, and z coordinates of the stereoscopic shape may be changed.

Figure 7:
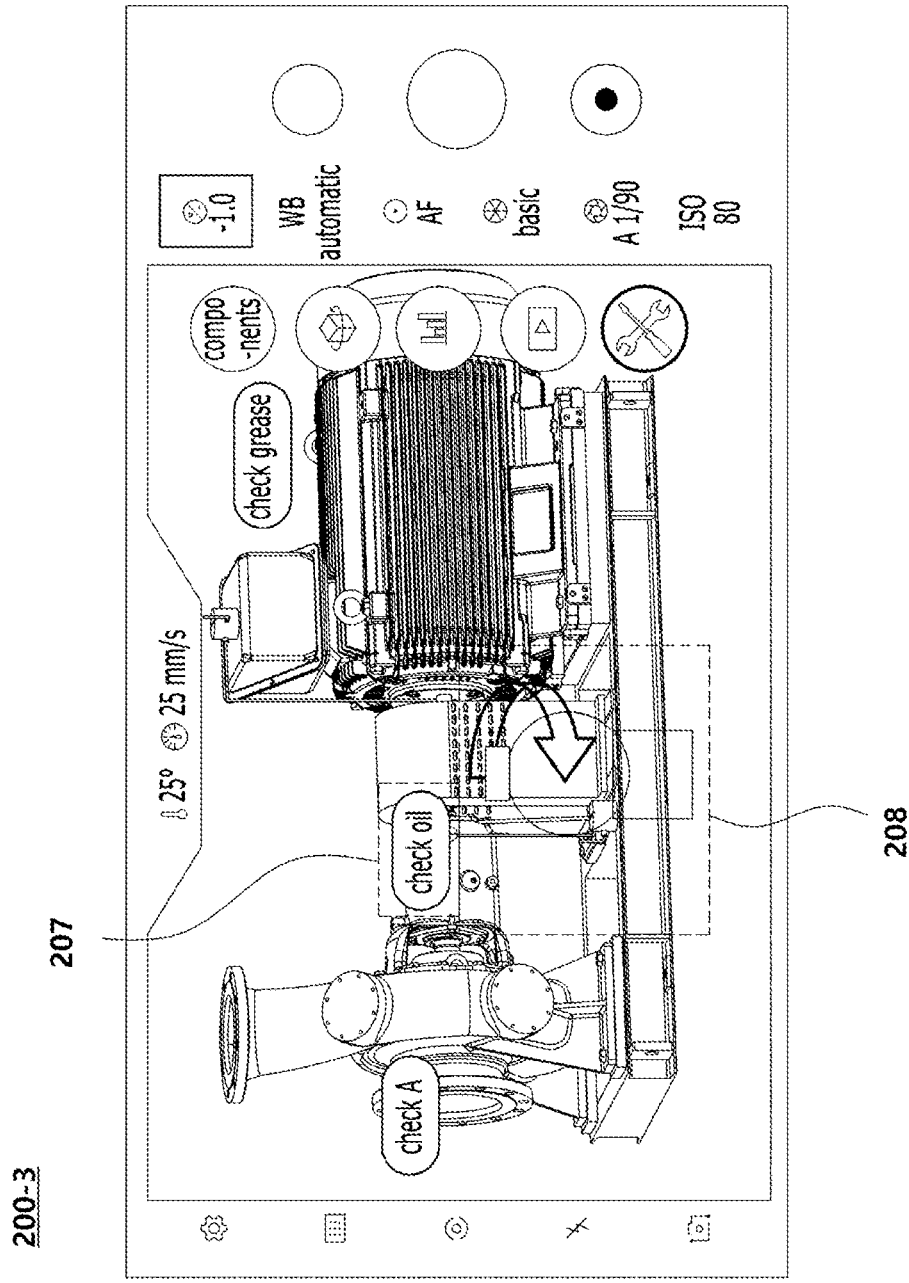
FIG. 7 is a fourth exemplary view illustrating an application driving screen of a mobile device according to an embodiment.

FIG. 7 is a fourth exemplary view illustrating an application driving screen of a mobile device according to an embodiment.

A screen 200-3 of a mobile device may include an element button region 207, an animation region 208, etc.

The element button region 207 may be a region for displaying information about a configuration in which an animation can be executed so as to correspond to each element of a product.

The animation region 208 may include a description necessary for a product check process, and may be a region for displaying the process of operation of elements. Only when a user touches the element button region 207, an animation may be driven in a partial region of the mobile device. The user can more easily learn a product defect repairing process through the animation driving process, and thus convenience in product management can be increased.

Figure 8:
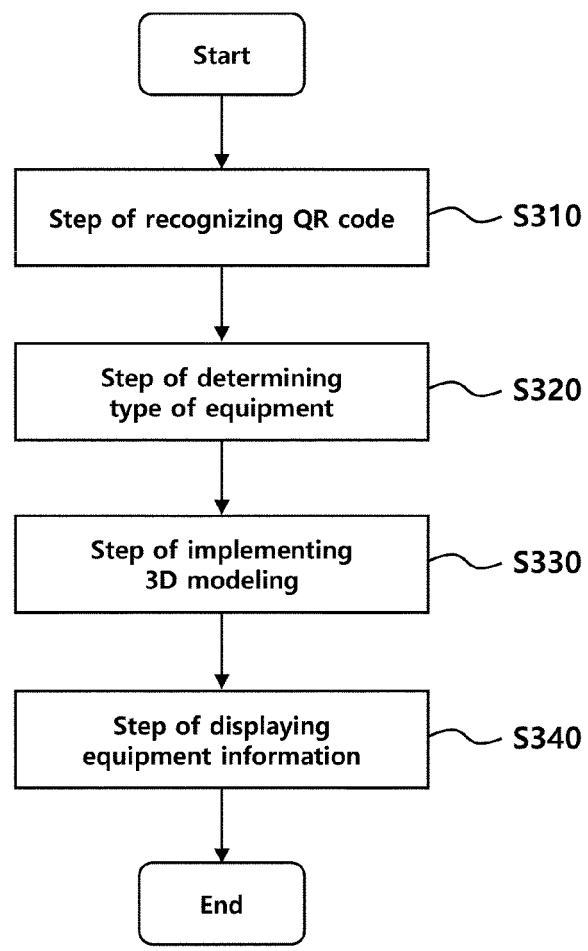
FIG. 8 is a flowchart illustrating an operation method of a mobile device according to an embodiment.

FIG. 8 is a flowchart illustrating an operation method of a mobile device according to an embodiment.

Referring to FIG. 8, an operation method 300 of a mobile device may include a step (S310) of recognizing a QR code, a step (S320) of determining the type of equipment, a step (S330) of implementing three-dimensional modeling, a step (S340) of displaying information about the equipment, etc.

The step (S310) of recognizing a QR code may be a step of recognizing, through a server or a mobile device, a QR code attached to industrial equipment, for example, a pump or motor.

In the step (S310) of recognizing a QR code, a camera included in a user's terminal may sense an identifier attached to the equipment, for example, a QR code or a bar code, and a server or the mobile device may receive and process data regarding the QR code.

The step (S320) of determining the type of equipment may be a step of comparing data regarding the identifier with a list regarding the types of multiple pieces of equipment, stored in a memory (not shown), through the server or the mobile device, to determine the type of the industrial equipment.

The step (S330) of implementing three-dimensional modeling may be a step of generating three-dimensional video data corresponding to the type of the equipment through the server or the mobile device.

The step (S340) of displaying information about the equipment may be a step of transferring three-dimensional video data stored in the server to the user's terminal and displaying the same, or displaying, on the user's terminal, the three-dimensional video data processed by the mobile device.

The operation method 300 of the mobile device according to an embodiment may further include a step of processing three-dimensional video data such that the three-dimensional video data corresponds to a specific element of the equipment or a specific position in the equipment. In order to process the three-dimensional video data, coordinates of an actually captured image may be acquired by defining an image region measured by the mobile device as two parameters (x, y), and coordinates of virtual video data on the mobile device may be acquired by defining virtual three-dimensional video data stored in the server as three parameters (x, y, z). The process of matching image data actually measured by the camera and three-dimensional modeling stereoscopic data stored in the server may be a process of automatically implementing a part of the above-described drag-and-drop principle in the server. A boundary value of the actually measured image data and the three-dimensional modeling data may be extracted, and each data may be matched with reference to the boundary value.

The operation method 300 of the mobile device according to an embodiment may further include a step of transmitting data including information about the specification or function of the equipment to the user's terminal on the basis of the user's input.

The operation method 300 of the mobile device according to an embodiment may further include a step of analyzing image data of the equipment, the image of which is captured by the camera of the user's terminal, or may further include a step of transmitting or displaying, to or on the user's terminal, augmented reality data of the equipment that is generated by combining the image data analyzed by the server or the mobile device with the three-dimensional video data.

The operation method 300 of the mobile device according to an embodiment may further include a step of receiving, from the user's terminal, touch input data including information about the position of the user's touch and transmitting animation data stored in the server or the mobile device to the user's terminal when touch position data is included in a region indicating an animation operation menu.

Figure 9:
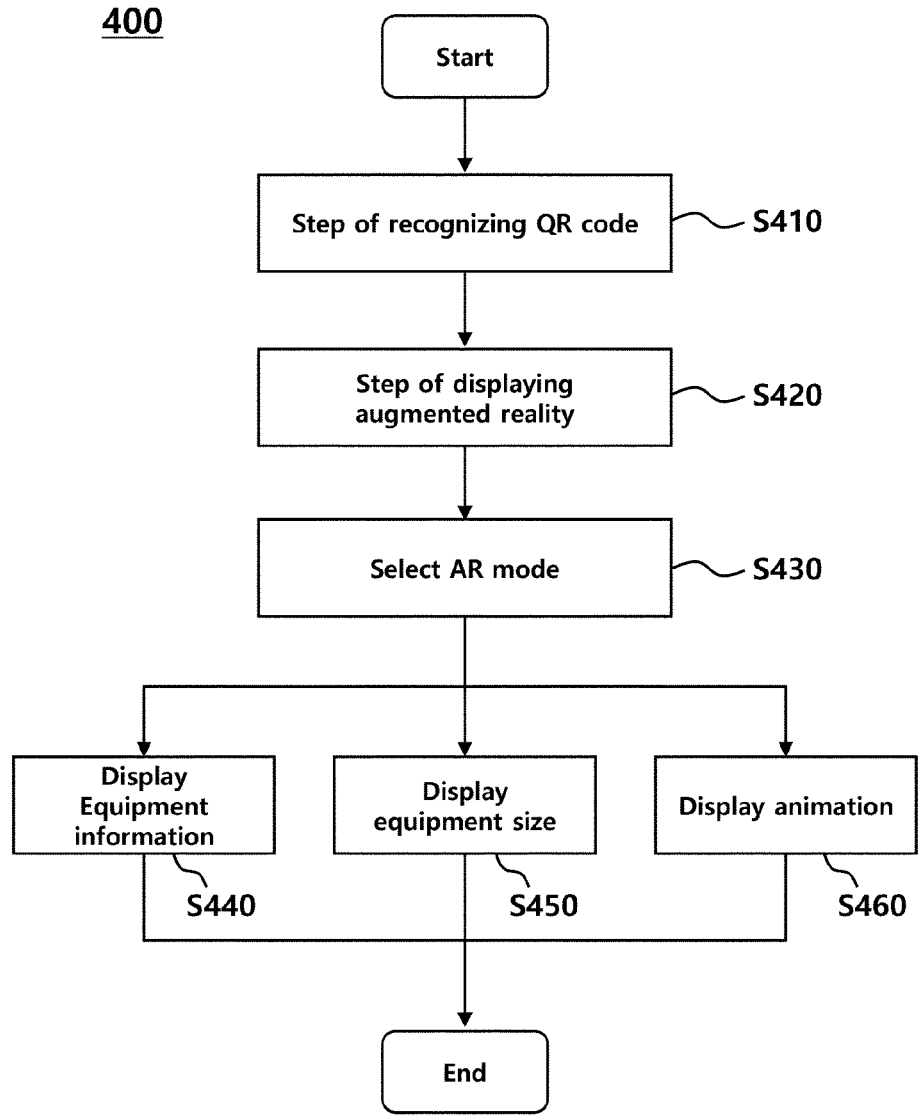
FIG. 9 is a flowchart illustrating a method for implementing augmented reality by a mobile device according to an embodiment.

FIG. 9 is a flowchart illustrating a method for implementing augmented reality by a mobile device according to an embodiment.

Referring to FIG. 9, an operation method 400 of a mobile device may include a step (S410) of recognizing a QR code, a step (S420) of displaying augmented reality, a step (S430) of selecting an augmented reality mode, a step (S440) of displaying information about equipment, a step (S450) of displaying the size of the equipment, a step (S460) of displaying an animation operation, etc.

The step (S410) of recognizing a QR code may be the same as the step of recognizing a QR code in FIG. 8 described above.

The step (S420) of displaying augmented reality may be the same as the step of displaying simulation data of equipment on a mobile screen in FIGS. 1 to 7 described above.

The step (S430) of selecting an augmented reality mode may include the step of touching a menu region in FIG. 5 described above. Each touch region may be defined while being divided into a region for performing the step (S440) of displaying information about the equipment, a region for performing the step (S450) of displaying the size of the equipment, and a region for performing the step (S460) of displaying an animation operation.

The step (S440) of displaying information about the equipment may include the method for displaying individual elements of the equipment in FIG. 5 described above. In relation to the individual elements of the equipment, text objects may be generated for each product so that types of and information about the individual elements of the equipment are input into the server in advance. The step of displaying information about the equipment may be controlled to be on/off by the user's manipulation.

The step (S450) of displaying the size of the equipment may include the method for displaying the size of the equipment in FIG. 6 described above.

The step (S460) of displaying an animation operation may include the method for displaying an animation operation of individual elements of the equipment in FIG. 7 described above.

FIG. 10 is a fifth exemplary view illustrating an application driving screen of a mobile device according to an embodiment.

Referring to FIG. 10, an application driving screen 500-1 of a mobile device may be divided into a region for displaying the number of pieces of industrial equipment, a region for displaying the number of sensors, and a region for displaying data measured by the sensors.

Figure 11:
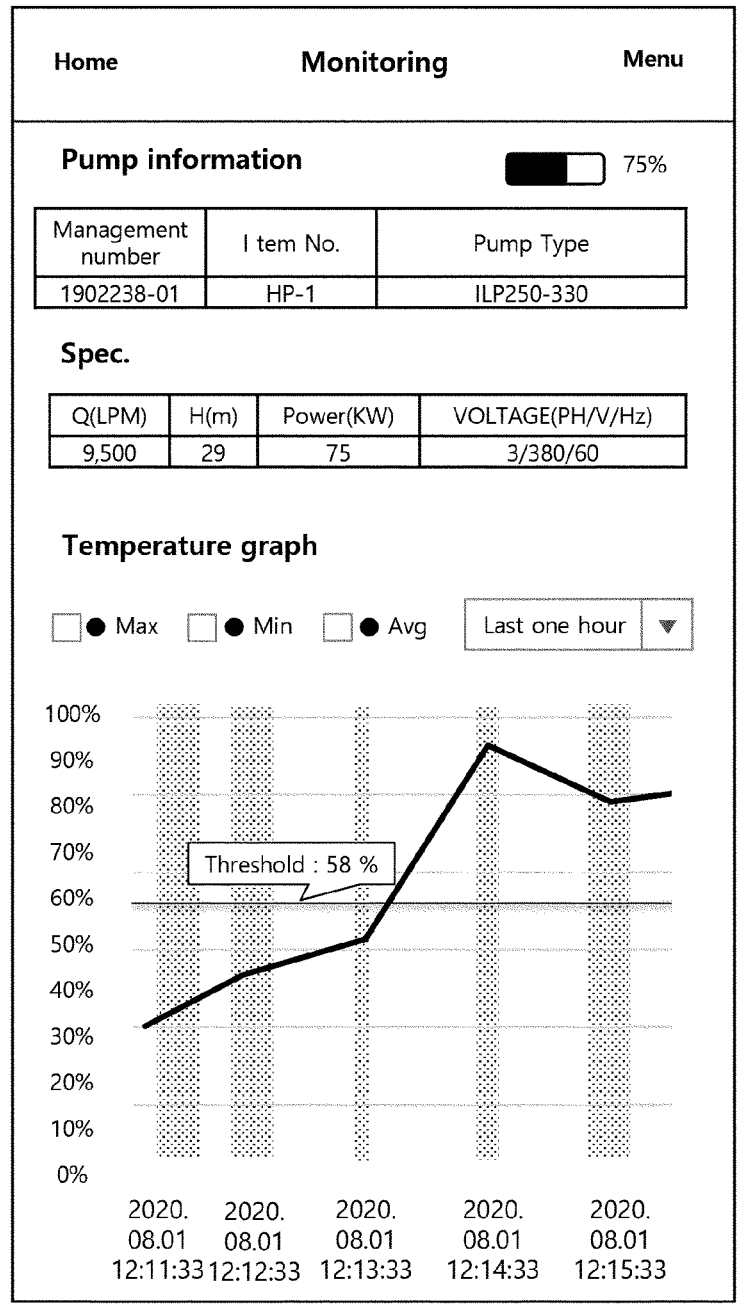
FIG. 11 is a sixth exemplary view illustrating an application driving screen of a mobile device according to an embodiment.

FIG. 11 is a sixth exemplary view illustrating an application driving screen of a mobile device according to an embodiment.

Referring to FIG. 11, application driving screen 500-2 of a mobile device may be divided into a region for displaying information and specification regarding industrial equipment and a region for displaying data monitored through the sensors in the form of text or graph.

Measured data received in real time by a wireless sensor (not shown) installed in the industrial equipment may be stored in a data server or the mobile device in real time, and a user or a manager may read the measured data in real time. For example, the measured data may be processed in the form of graph and may provide data analysis function for the user or the manager.

The real-time temperature and vibration of IoT may be monitored. A threshold, which becomes a reference for issuing an alarm, is configured such that an alarm may be transferred to the mobile device and displayed thereon.

Figure 12:
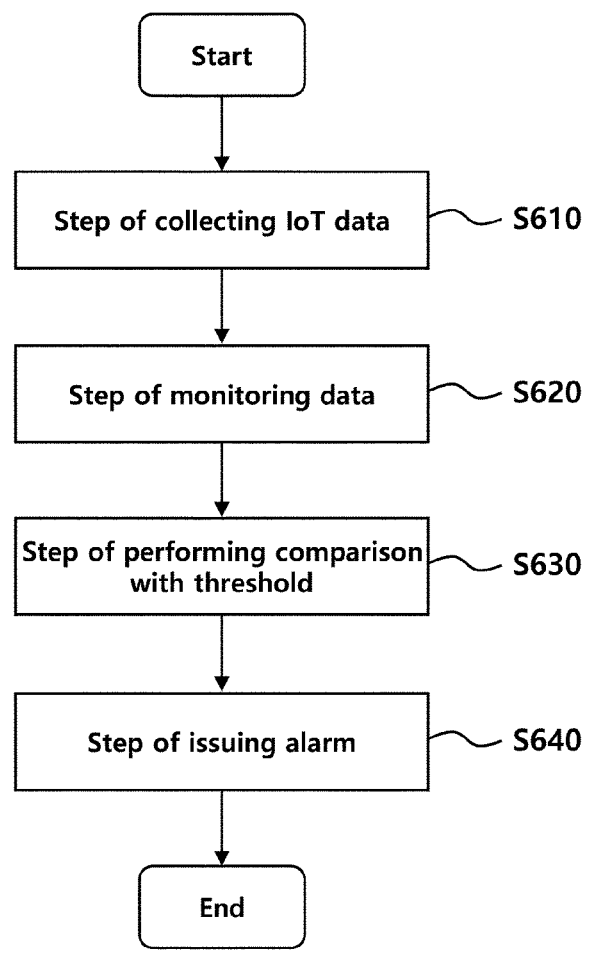
FIG. 12 is a flowchart illustrating a method for monitoring data by a server according to an embodiment.

FIG. 12 is a flowchart illustrating a method for monitoring data by a server according to an embodiment.

Referring to FIG. 12, a method 600 for monitoring data by a server may include a step (S610) of collecting IoT data, a step (S620) of monitoring data, a step (S630) of comparing measured data with a threshold, a step (S640) of issuing an alarm, etc.

The step (S610) of collecting IoT data may be a step of collecting data in real time through at least one sensor attached to industrial equipment, for example, a pump or a motor.

The step (S620) of monitoring data may be a step of monitoring measured data indicating the state of the industrial equipment by a server. The server may store the measured data in a memory (not shown) for a predetermined period.

The step (S630) of comparing measured data with a threshold may be a step of comparing a configured threshold with the measured data. The measured data compared with the threshold may be data measured at a single time point, but may be data generated by averaging measured data for a predetermined time interval.

The step (S640) of issuing an alarm may be a step of issuing an alarm when measured data exceeding the threshold is generated. For example, when the number of times measured data exceeds the threshold corresponds to a predetermined number of times, for example, a reference number of times, an alarm may be issued. In another example, when the time during which measured data exceeds the threshold corresponds to a predetermined time, for example, a reference time, an alarm may be issued.

Figure 13:
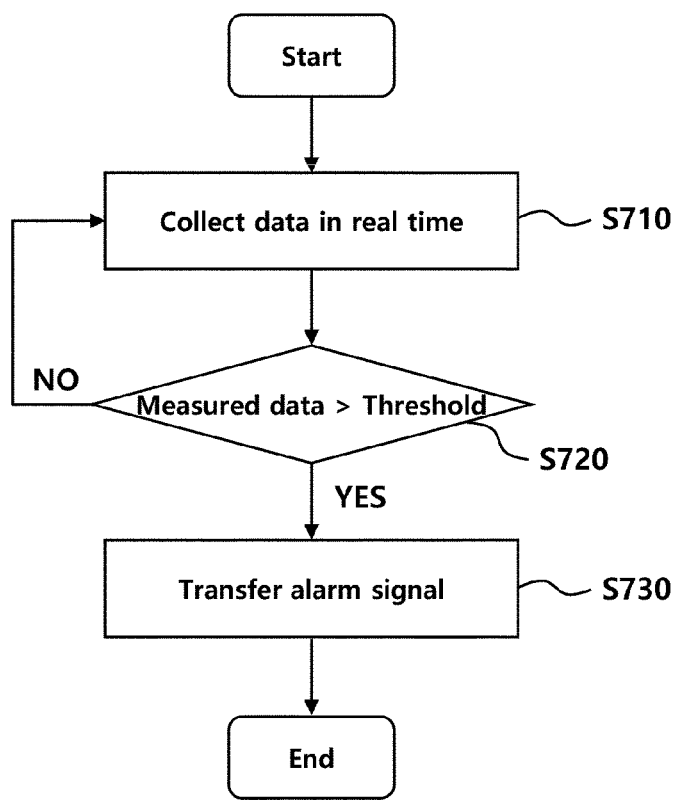
FIG. 13 is a flowchart illustrating a method for transferring an alarm signal by a server according to an embodiment.

FIG. 13 is a flowchart illustrating a method for transferring an alarm signal by a server according to an embodiment.

Referring to FIG. 13, a method 700 for transferring an alarm signal by a server may include a step (S710) of collecting data in real time, a step (S720) of comparing measured data with a threshold, a step (S730) of transferring an alarm signal to a mobile device, etc.

The step (S710) of collecting data in real time may include the step (S610) of collecting IoT data and/or the step (S620) of monitoring data in FIG. 12 described above.

In the step (S720) of comparing measured data with a threshold, an alarm signal may be transferred to a mobile device only when measured data measured through a sensor of equipment exceeds a threshold, and when the measured data does not exceed the threshold, real-time monitoring may be continuously performed.

The step (S730) of transferring an alarm signal to a mobile device may be a step of transferring an alarm signal to the mobile device only when the measured data exceeds the threshold, for example, when temperature data exceeds a reference temperature.

Figure 14:
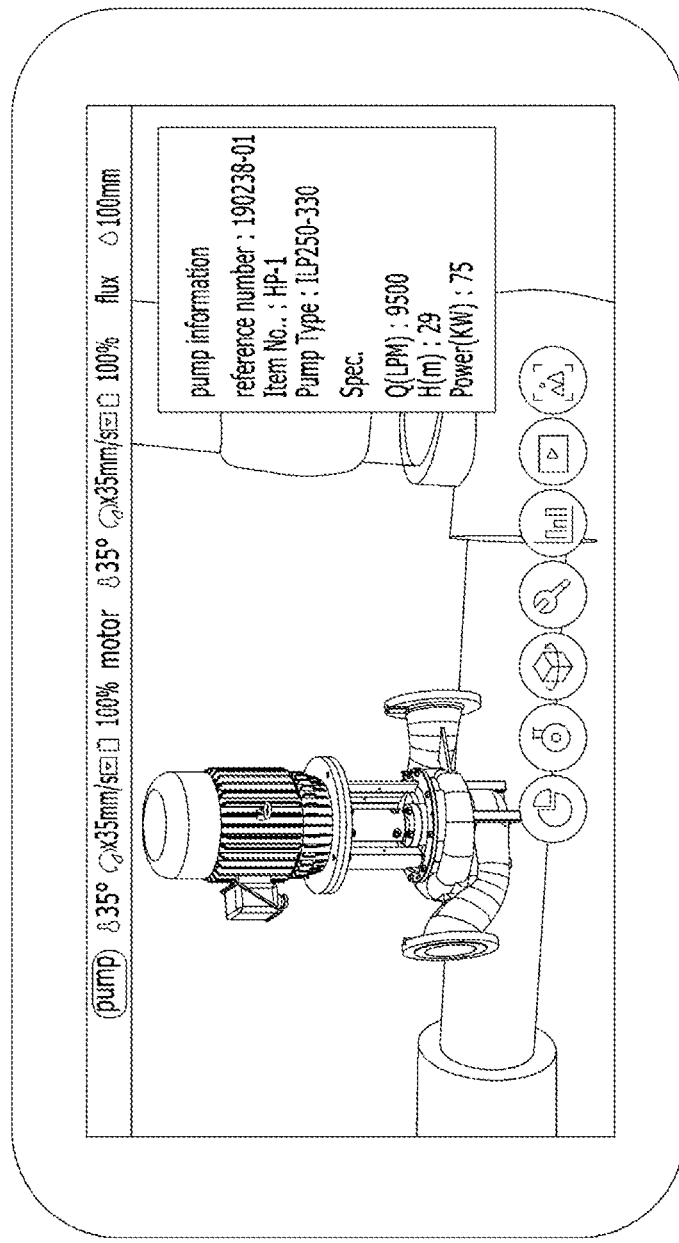
FIG. 14 is a seventh exemplary view illustrating an application driving screen of a mobile device according to an embodiment.

FIG. 14 is a seventh exemplary view illustrating an application driving screen of a mobile device according to an embodiment.

Figure 15:
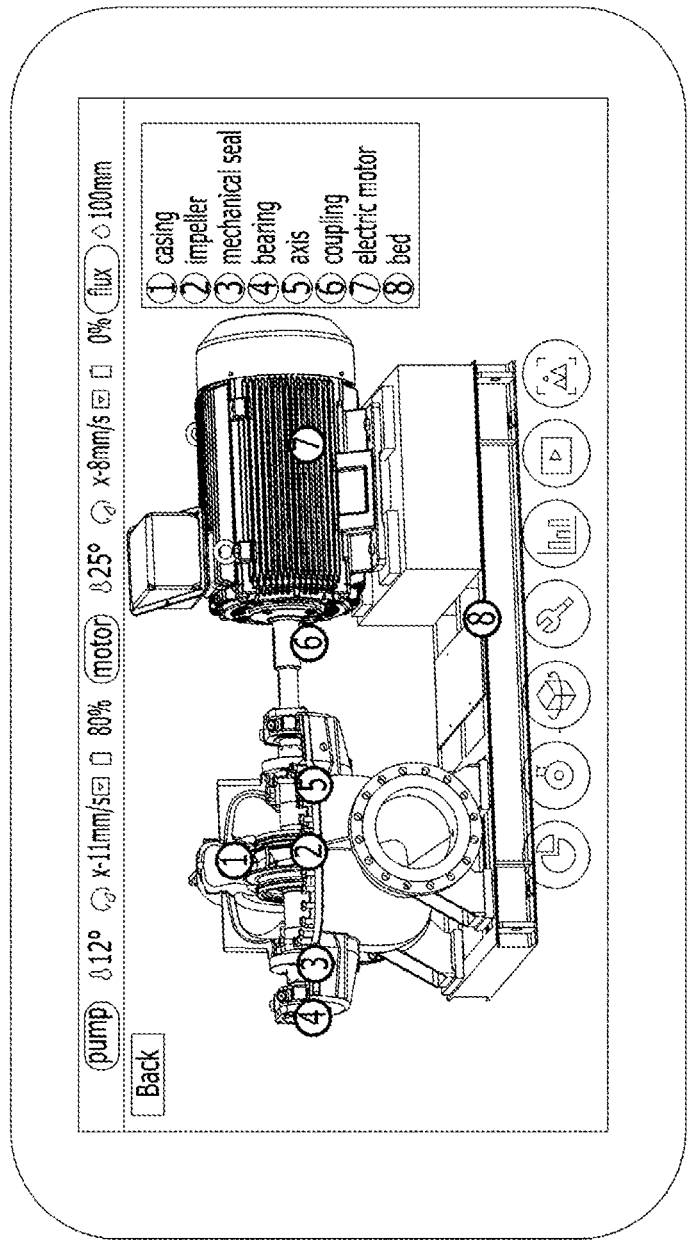
FIG. 15 is an eighth exemplary view illustrating an application driving screen of a mobile device according to an embodiment.

FIG. 15 is an eighth exemplary view illustrating an application driving screen of a mobile device according to an embodiment.

Figure 16:
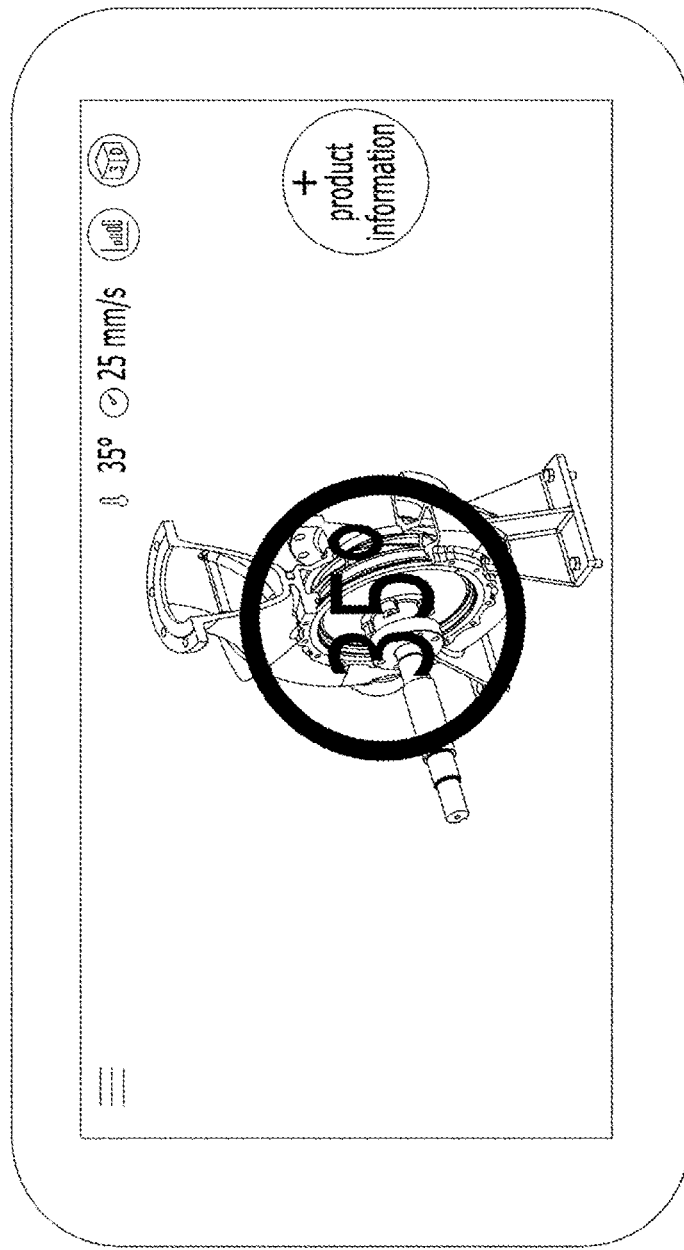
FIG. 16 is a ninth exemplary view illustrating an application driving screen of a mobile device according to an embodiment.

FIG. 16 is a ninth exemplary view illustrating an application driving screen of a mobile device according to an embodiment.

Figure 17:
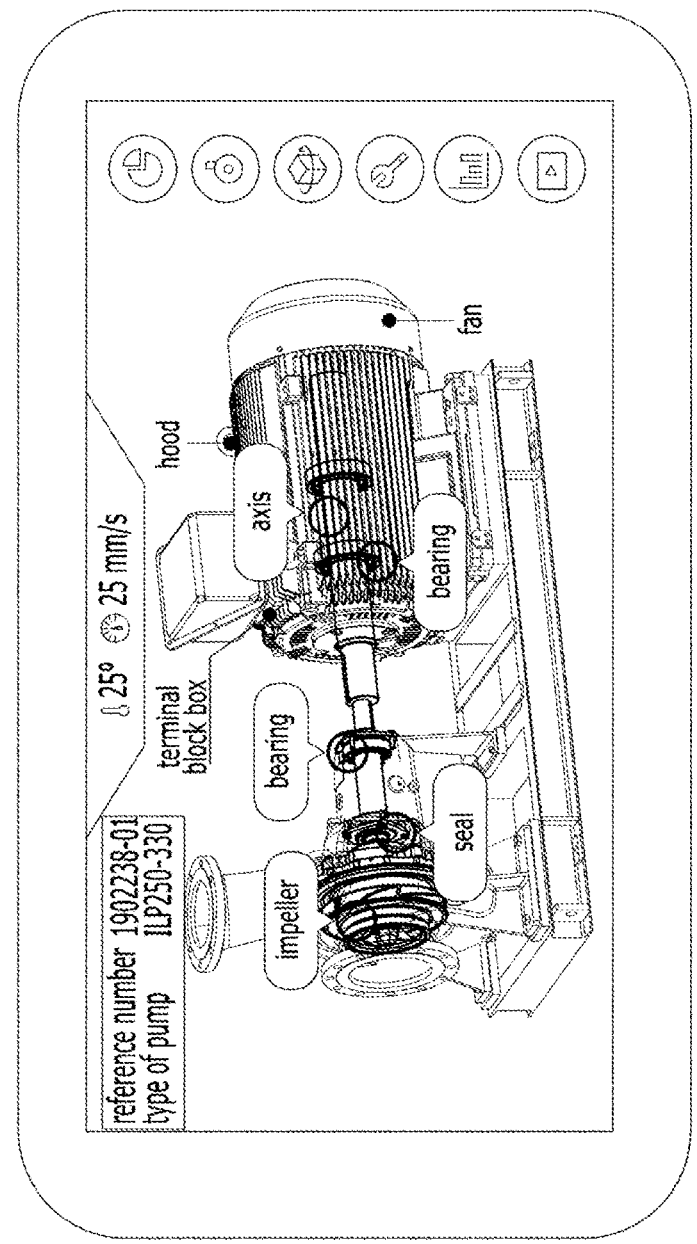
FIG. 17 is a tenth exemplary view illustrating an application driving screen of a mobile device according to an embodiment.

FIG. 17 is a tenth exemplary view illustrating an application driving screen of a mobile device according to an embodiment.

Figure 18:
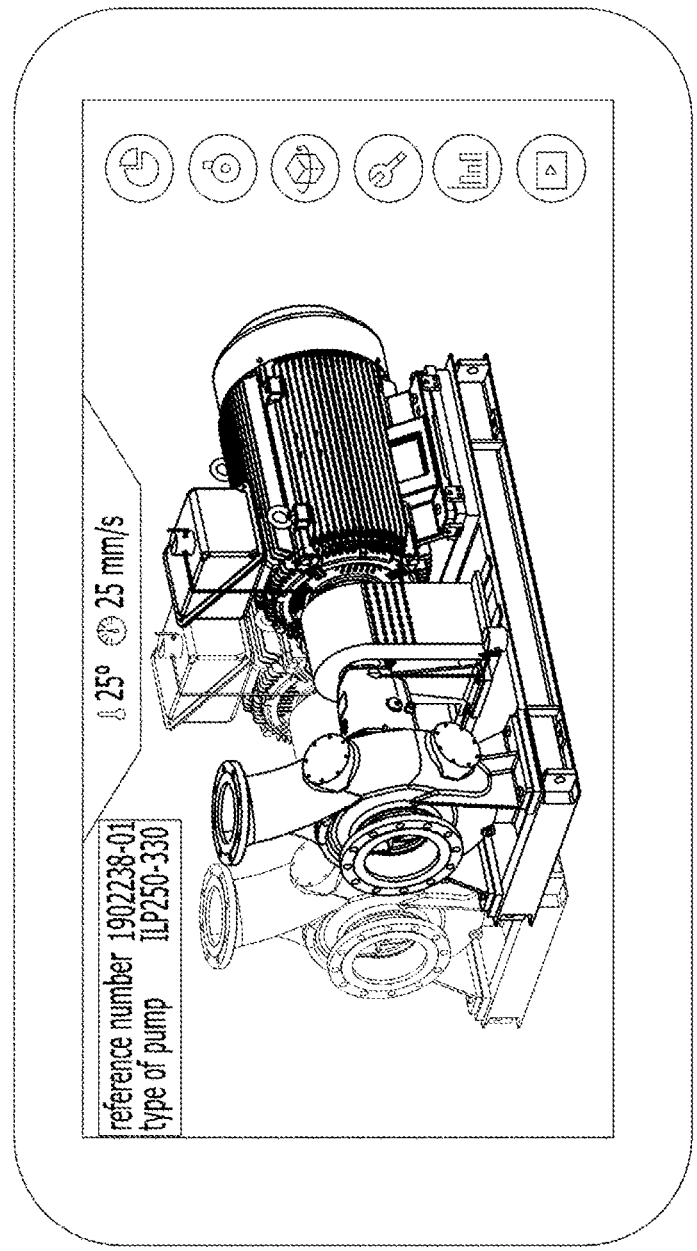
FIG. 18 is an eleventh exemplary view illustrating an application driving screen of a mobile device according to an embodiment.

FIG. 18 is an eleventh exemplary view illustrating an application driving screen of a mobile device according to an embodiment.

Figure 19:
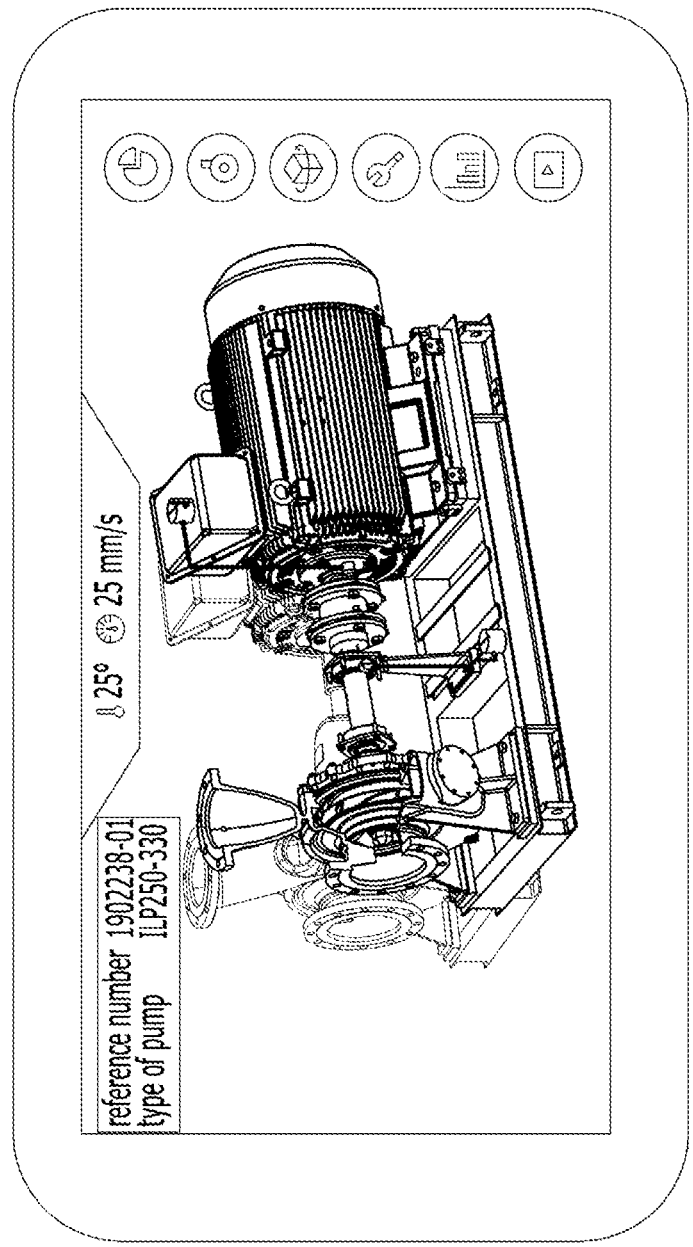
FIG. 19 is a twelfth exemplary view illustrating an application driving screen of a mobile device according to an embodiment.

FIG. 19 is a twelfth exemplary view illustrating an application driving screen of a mobile device according to an embodiment.

Figure 20:
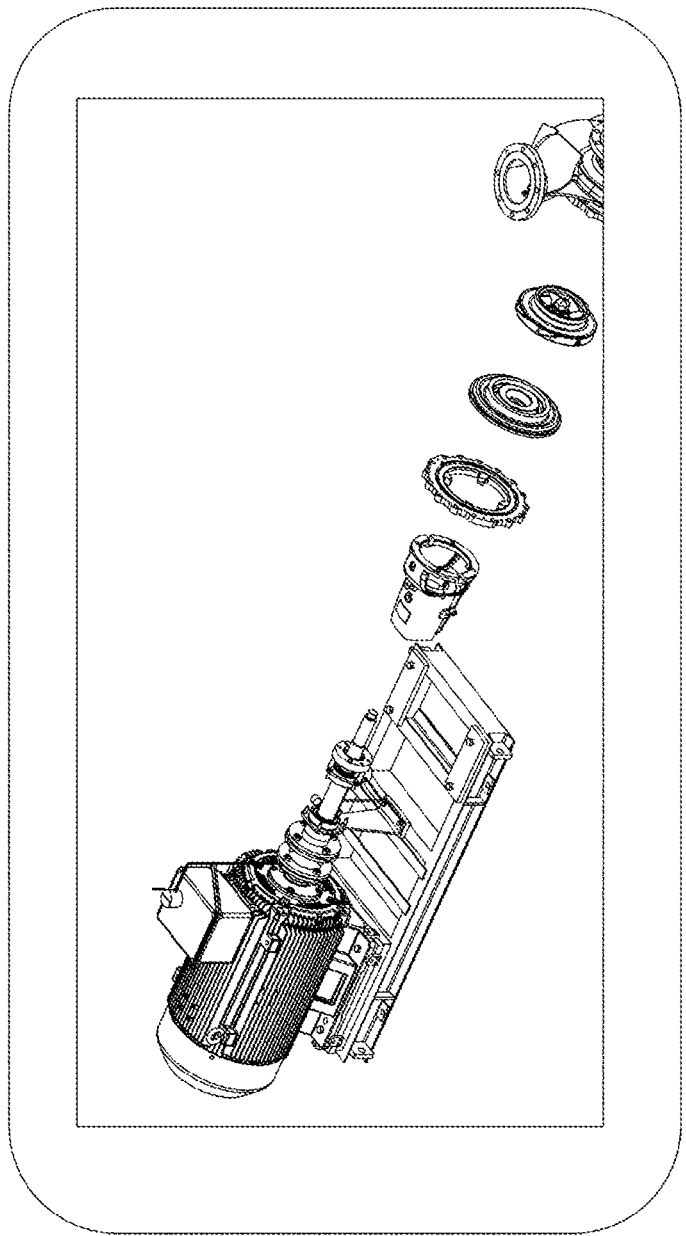
FIG. 20 is a thirteenth exemplary view illustrating an application driving screen of a mobile device according to an embodiment.

FIG. 20 is a thirteenth exemplary view illustrating an application driving screen of a mobile device according to an embodiment.

Figure 21:
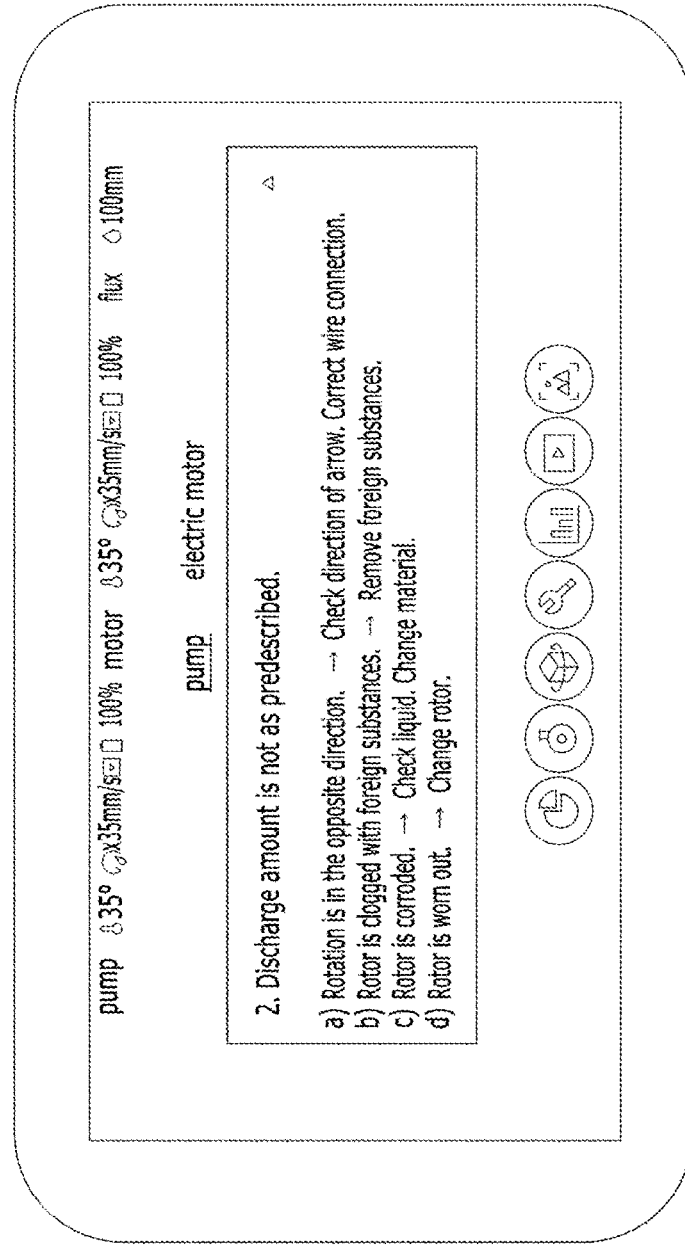
FIG. 21 is a fourteenth exemplary view illustrating an application driving screen of a mobile device according to an embodiment.

FIG. 21 is a fourteenth exemplary view illustrating an application driving screen of a mobile device according to an embodiment.

Referring to FIGS. 14 to 21, an application driving screen configuration 800-1, 800-2, 800-3, 800-4, 800-5, 800-6, 800-7, or 800-8 of a mobile device may be differently defined depending on screen manipulation of a user.

The application driving screen 800-1 of a mobile device may be a screen for displaying information about equipment.

The application driving screen 800-2 of a mobile device may be a screen for displaying detailed information about elements of equipment. Elements of each piece of equipment may provide intuition to a user through separate labelling.

The application driving screen 800-3 of a mobile device may be a screen for displaying alarm information when measured data of equipment exceeds a threshold.

The application driving screen 800-4 of a mobile device may be a screen illustrating some elements of equipment through a virtual simulation screen.

The application driving screen 800-5 of a mobile device may be a screen for comparing and displaying a measurement video and a simulation video of equipment.

The application driving screen 800-6 of a mobile device may be a screen for displaying a partial section of a simulation video in detail.

In the application driving screens 800-4, 800-5, and 800-6 of the mobile device, a virtual simulation screen may be provided while being superposed on or matched with a real screen, thereby providing intuition and convenience to the user.

When an element of a partial section of a simulation video is shown, the user can easily and intuitively understand the actual configuration of the equipment, can determine the state of the equipment, for example, occurrence of abnormality and malfunction of the equipment, and can accurately manipulate elements of the equipment. It is possible to understand the configuration of an element in the equipment through simulation, and check a sensing value of the element, for example, sensing data for determining the temperature or vibration of the element, to determine whether the element malfunctions.

The application driving screen 800-7 of a mobile device may be a screen for displaying some elements of a simulation video in detail while spacing the same out. If necessary, a screen illustrating the position of each element may be implemented as a moving image.

The application driving screen 800-8 of a mobile device may be a screen for displaying text that describes a solution for each malfunctioning element of the equipment.

Figure 22:
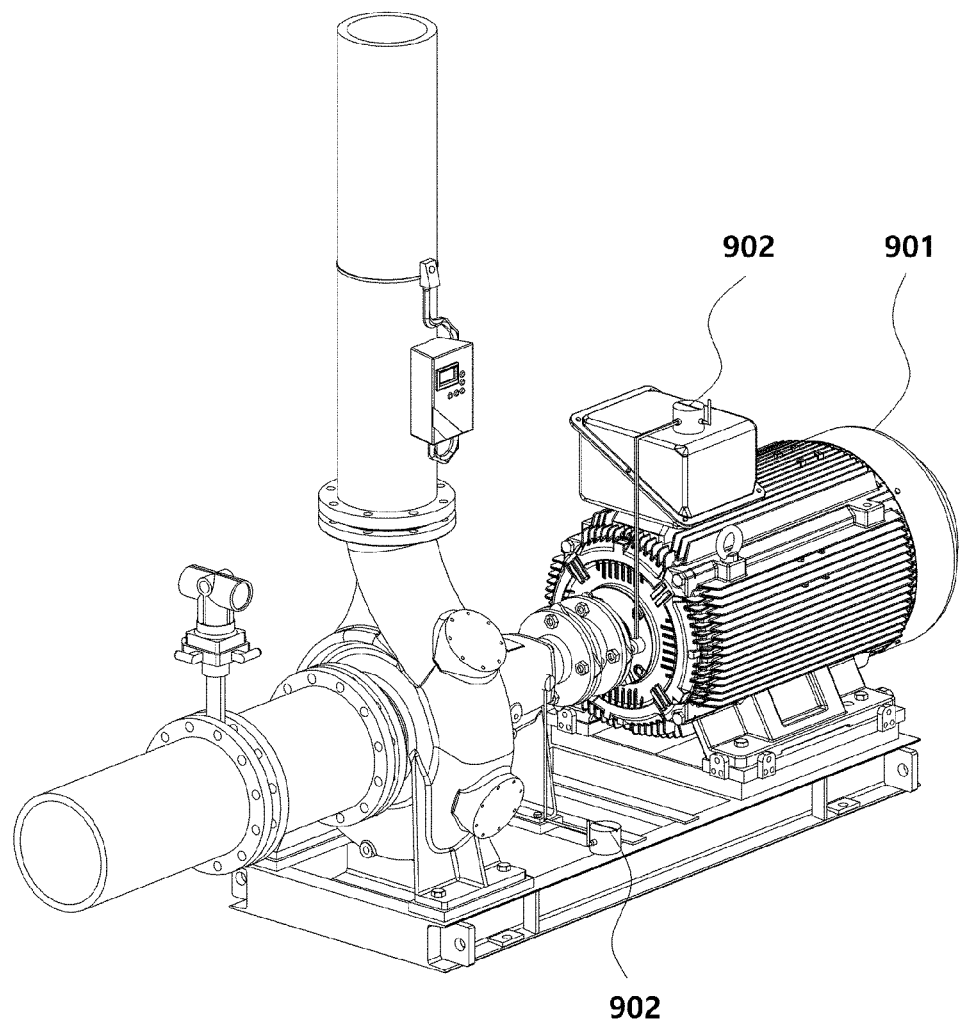
FIG. 22 illustrates industrial equipment to which an IoT wireless sensor according to an embodiment is attached.

FIG. 22 illustrates industrial equipment to which an IoT wireless sensor according to an embodiment is attached.

Referring to FIG. 22, a system 900 to obtain data from an industrial equipment to which an IoT wireless sensor is attached may include industrial equipment 901 and an IoT wireless sensor 902.

The industrial equipment 901 may include a pump, a motor, a compressor, a turbine, etc., but in the case of mechanical equipment included an industrial plant, the type thereof is not limited.

The IoT wireless sensor 902 is a sensor capable of measuring the state of industrial equipment, such as a temperature sensor, a vibration sensor, a flow sensor, or a power sensor, and may be attached to the outer surface or the inner surface of the industrial equipment 901.

The IoT wireless sensor 902 may transmit or receive various types of data such as measured data to or from a mobile device (not shown) or a server (not shown) in real time through Long Range (LoRa) wireless communication, Wireless Fidelity (Wi-Fi) wireless communication, Bluetooth wireless communication, or the like.

In order to accurately measure data of the industrial equipment 901, the IoT wireless sensor 902 may be installed at a position in which the amount of change in vibration or temperature is large, and multiple IoT wireless sensors 902 may be disposed at multiple positions to acquire measured data of various positions. If necessary, the IoT wireless sensor 902 may be configured to have one communication unit (not shown) and have multiple signal transfer lines (not shown) and multiple sensing units (not shown), but is not limited thereto.

Figure 23:
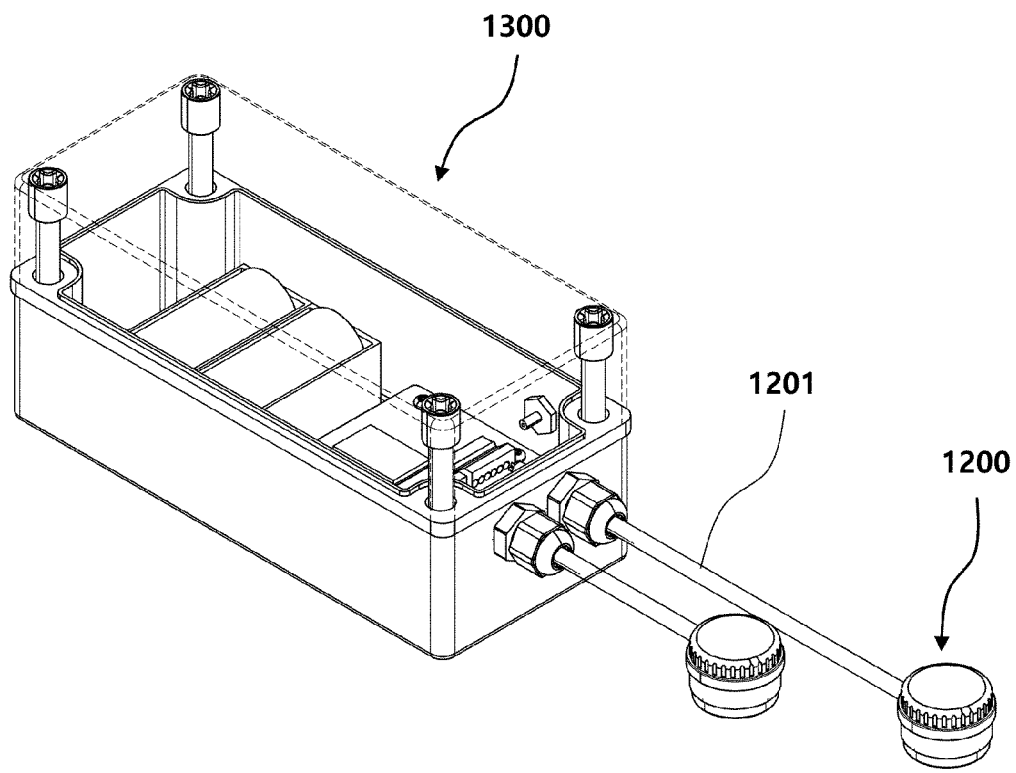
FIG. 23 is a view illustrating an IoT sensor according to an embodiment.

FIG. 23 is a view illustrating an IoT sensor according to an embodiment.

Figure 24:
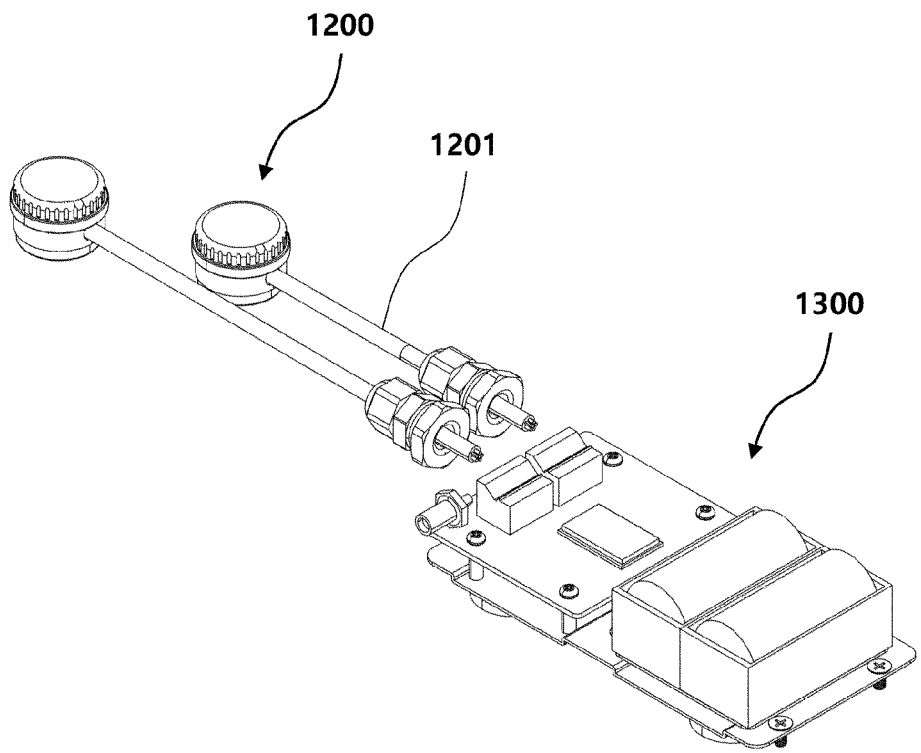
FIG. 24 is a view illustrating components of an IoT sensor according to an embodiment.

FIG. 24 is a view illustrating components of an IoT sensor according to an embodiment.

Referring to FIGS. 23 and 24, an IoT sensor 1000 may include a measurement unit 1200, a cable 1201, a communication unit 1300, etc.

The IoT sensor 1000 may be a sensor which is disposed on the surface of industrial equipment or inside the industrial equipment so as to acquire various types of data. The elements may be physically or conceptually divided, and thus the IoT sensor may be divided into the measurement unit 1200 and the communication unit 1300.

The measurement unit 1200 of the IoT sensor 1000 may include: a first substrate (not shown); and a first connector (not shown) electrically connected to the first substrate and attached to the surface of the first substrate so as to transfer a measurement signal of the sensor.

The measurement unit 1200 may be a device configured to acquire data of a specific part of the industrial equipment, and may be a sensor capable of measuring the state of the industrial equipment, such as a temperature sensor, a vibration sensor, a flow sensor, or a power sensor.

The communication unit 1300 of the IoT sensor 1000 may include: a second connector (not shown) connected to the other end of the cable and configured to receive the measurement signal of the sensor; and a communication module (not shown) attached to a second substrate connected to the second connector.

The communication unit 1300 may transmit or receive data acquired by the measurement unit 1200 to or from a server (not shown) or an internal storage device (not shown) through wired or wireless communication. For example, the communication unit 1300 may transmit or receive measured data to or from a mobile device (not shown) or the server (not shown) through Long Range (LoRa) wireless communication, Wireless Fidelity (Wi-Fi) wireless communication, or the like.

The mobile device (not shown) may include a smartphone, a tablet, a computer, a notebook computer, a wearable device, a digital camera, etc., but may include a computer-based web as necessary, and the type thereof is not limited.

The server (not shown) may include a physical computing server, a web server, a database server, etc., and may be a cloud server for implementing a virtual network environment, but is not limited thereto.

The communication unit 1300 and the measurement unit 1200 of the IoT sensor 1000 may be connected to each other through the cable 1201 or the like.

The cable 1201 may include at least one conductive wire, and may include multiple conductive wires corresponding to the number of sensors of the measurement unit 1200.

The length of the cable 1201 may be adjusted so as to correspond to the position of the measurement unit 1200. The position of the measurement unit 1200 is required to be adjustable so as to correspond to the type and the size of the industrial equipment, and thus a flexible wire may be used as the cable 1201. Further, the cable 1201 may be disposed at a predefined position, or may have a predefined length.

The measurement unit 1200 and the communication unit 1300 of the IoT sensor 1000 may be manufactured in a separated form, and then may be coupled to each other.

Each of the measurement unit 1200 and the communication unit 1300 may be manufactured in a form in which the same can be attached to or detached from the cable 1201. For example, the communication unit 1300 may be coupled to the measurement unit 1200 and the cable 1201 connected to the measurement unit 1200.

The cable 1201 may connect the measurement unit 1200 to the communication unit 1300 by a structure for electrical connection, such as a connector.

A physical fixing device (not shown) may be further included in order to maintain a coupling force of the cable 1201. For example, the fixing device (not shown) may be a bolt or nut structure connected to the surface of the cable 1201.

The cable 1201 may be divided into multiple regions, and may be selectively connected to various types of sensors. Therefore, the fixing device (not shown) may be disposed at a position adjacent to the communication unit 1300. In this case, it is possible to quickly and easily replace only the measurement unit 1200 without replacing the fixing device (not shown).

The IoT sensor 1000 may refer to a wired or wireless sensor for implementing Internet Of Things (IoT), but the type thereof is not limited if the same can communicate with the mobile device (not shown) or the server (not shown) in a wired or wireless manner.

The IoT sensor 1000 may be installed in various positions or various elements such as a rotor, a vibrator, a compressor, a bearing, a fan, etc. of a motor or a pump, and may perform wireless communication with a network server.

The IoT sensor 1000 may adopt a TCP/IP socket communication method including a server socket and a client socket to transmit information about pieces of industrial equipment to the server.

The IoT sensor 1000 may include the measurement unit 1200, the cable 1201, a processor (not shown), and the communication unit 1300, and may be implemented by integrating functions of various sensors. The measurement unit 1200 may include a magnet, and thus may be attached to a predetermined portion of industrial equipment to measure the physical characteristics of the industrial equipment in real time. A signal measured by the measurement unit 1200 may be transferred to an internal processor (not shown) and the communication unit 1300 through the cable 1201.

The communication unit 1300 may communicate with the server or the mobile device by using the above-described wired or wireless communication method.

The IoT sensor 1000 may adopt the wired or wireless communication method to transmit or receive temperature data or vibration data, but may adopt a mixed scheme of wired communication or wireless communication to transmit or receive each piece of data.

The industrial equipment may include a pump, a motor, etc., but in the case of mechanical equipment included in an industrial plant, the type thereof is not limited.

Figure 25:
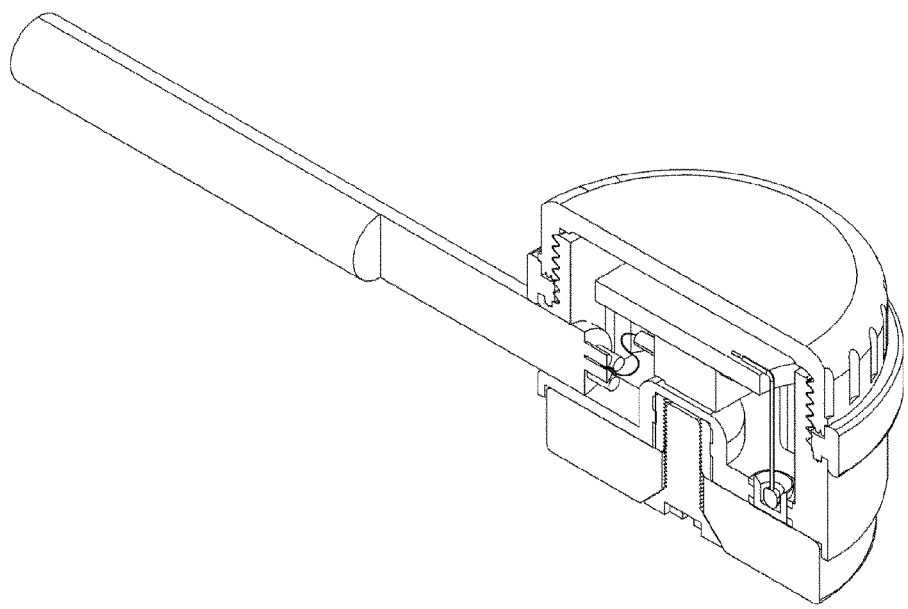
FIG. 25 is a view illustrating a measurement unit of an IoT sensor according to an embodiment.

FIG. 25 is a view illustrating a measurement unit of an IoT sensor according to an embodiment.

Figure 26:
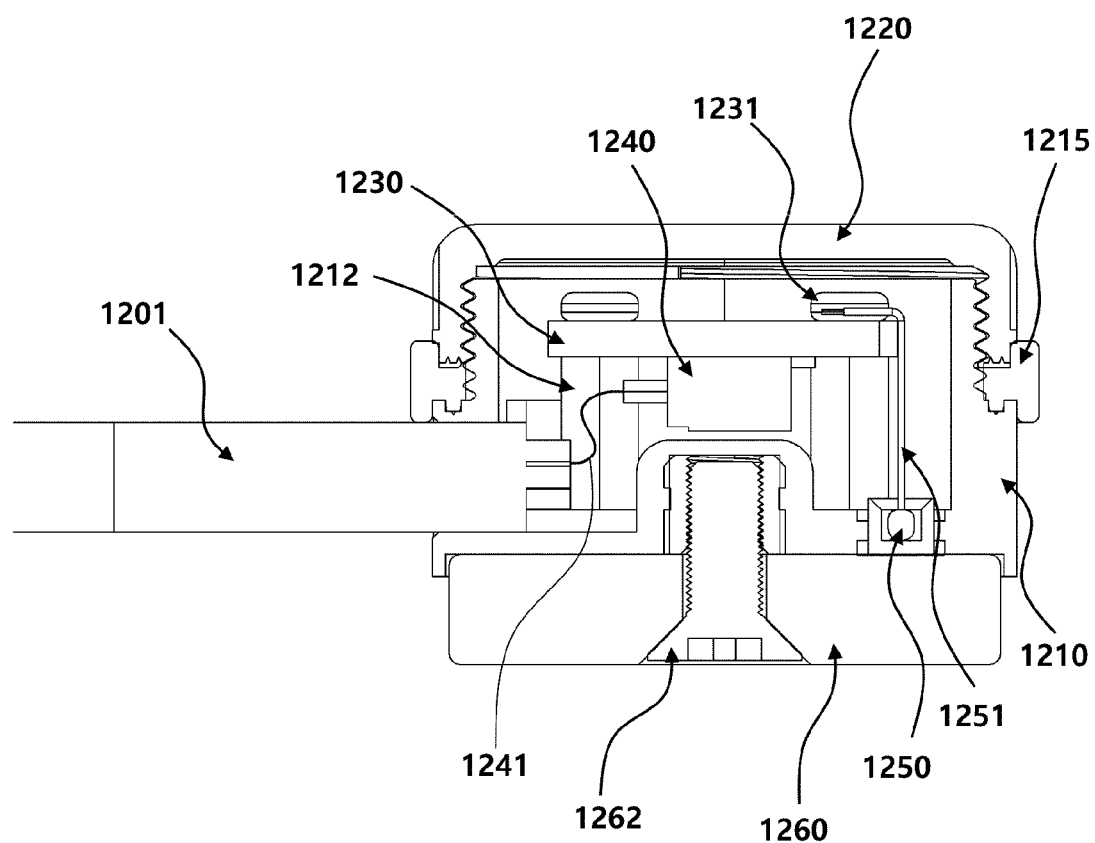
FIG. 26 is a vertical cross-sectional view of a measurement unit of an IoT sensor according to an embodiment.

FIG. 26 is a vertical cross-sectional view of a measurement unit of an IoT sensor according to an embodiment.

Referring to FIGS. 25 and 26, a measurement unit 1200 of an IoT sensor may include a body 1210, a cover 1220, a first substrate 1230, a first connector 1240, a temperature sensor 1250, etc.

The body 1210 forms the exterior of the measurement unit 1200, and may be a physical structure which isolates components of the sensor from the outside environment. The body 1210 may have a cylindrical structure, but is not limited thereto. A partial region of the bottom surface of the body 1210 may have a flat shape, but another partial region may have a protruding shape due to the bolt 1262. When a length by which the bolt 1262 is inserted increases, a coupling force of a magnet 1260 may be strengthened, but may be adjusted in consideration of the position of the connector 1240 and the degree of integration of an inner space.

The body 1210 may further include a vertical structure 1212 which is connected to and supports the first substrate 1230. The vertical structure 1212 allows the bottom surface of the body 1210 and the first substrate 1230 to be spaced a predetermined distance apart from each other, and may improve space utilization such that all of both surfaces of the first substrate 1230 can be used.

Further, the vertical structure 1212 may be coupled to a coupling member (not shown) such as a bolt to increase a support force of the first substrate 1230, and the coupling member (not shown) may be selectively coupled or decoupled for maintenance or repair of a product.

The cover 1220 may be coupled to the body 1210 to form a sealed inner space. The cover 1220 may be detachably coupled to the body 1210, and may have a spiral groove formed therein to allow the same to be attached or detached.

A groove formed in the body 1210 and a groove formed in the cover 1220 may correspond to each other in shape so as to be brought into close contact with each other. Even when the body 1210 is tightly coupled to the cover 1220, a spatial gap may be formed therebetween, or a gap having a vertical length may be formed therebetween by the difference between lengths of coupled portions.

Further, a silicone-type packing rubber 1215 may be inserted into the gap between the body 1210 and the cover 1220 or the gap formed while the body 1210 is coupled to the cover 1220 to increase a sealing force of the measurement unit 1200. Since the packing rubber is coupled, it is possible to block a fluid, dust, or the like introduced into the measurement unit of the sensor and acquire a waterproofing level equal to or higher than an appropriate reference. The packing rubber 1215 may have the shape of a ring formed of a silicone material, but is not limited thereto.

As illustrated in FIG. 26, the packing rubber 1215 may surround the entire surfaces or partial surfaces of the body 1210 and the cover 1220, thereby increasing a shielding effect. The packing rubber 1215 may be formed to have a diameter larger than the diameter of the cover 1220, and may doubly shield even the outer peripheral region of a portion of the cover 1220, thereby improving waterproofing or dustproofing efficiency.

The packing rubber 1215 may have a vertical length longer than the length of the gap formed after the body 1210 is coupled to the cover 1220, and may be pressed, thereby further improving a sealing force.

The body 1210 and the cover 1220 may be defined as a case of the measurement unit 1200, but is not limited thereto.

The first substrate 1230 may be an element which transmits or receive a signal to or from each of electrical components through contact between the components and the substrate or through an electrical wire.

The first substrate 1230 may be a printed circuit board (PCB), but is not limited thereto. Various elements or components may be coupled to the upper surface or the lower surface of the first substrate 1230.

The connector 1240 may be connected to the lower surface, rather than the upper surface, of the first substrate 1230, and thus the volume of the measurement unit 1200 may be reduced. According to the conventional method, a sensor line 1241 is directly soldered and fixed to a substrate, and thus maintenance and defect repair thereof are impossible, and the sensor line 1241 may be cut or damaged during separation of the sensor. When the connector 1240 is used while being connected to the first substrate 1230, it is possible to provide convenience in repairing defects of a product and improve the durability of the product.

A temperature sensor line 1251 may be connected to the upper surface of the first substrate 1230. The temperature sensor line 1251 may be attached to the first substrate 1230 by soldering, and may be detachably attached to the first substrate 1230.

A coupling member 1231 connected to the temperature sensor line 1251 may be a lead composition, or may be a connector.

Various types of sensors, such as a vibration sensor or a temperature sensor, may be coupled to the first substrate 1230. In order to minimize the effect of temperature of an ambient environment, the temperature sensor 1250 may be connected to the temperature sensor line 1251 and may be disposed in a space, for example, the bottom surface of the body 1210, which is separate from the first substrate 1230.

The first connector 1240 may be electrically connected to the first substrate 1230, and may be attached to the surface of the first substrate 1230 to transfer a measurement signal of a sensor (not shown). The sensor (not shown) may be the above-described predetermined sensor such as a vibration sensor, a temperature sensor, or the like.

The temperature sensor 1250 may be maintained while being coupled to a hole (not shown) formed in a partial region of the bottom surface of the body 1210, and may be maintained while being fitted and fixed by a fixing ring or the like. The temperature sensor 1250 may be maintained at the same position regardless of whether the first substrate 1230 is attached or detached, and only one end of the temperature sensor line 1251 may be detached, and thus the temperature sensor 1250 may not be detached in the process of maintenance/repair of a product, whereby the durability and the economical efficiency can be improved. The temperature sensor line 1251 may be a metal line for temperature data transmission.

The magnet 1260 may be a magnetic structure having magnetism, and may be attached to the outer surface of the body 1210. In order to improve the durability of the measurement unit 1200, the magnet 1260 may be maintained while being fixed by the bolt 1262. For example, a neodymium magnet, etc. may be adopted as the magnet 1260, but the magnet 1260 is not limited thereto.

The radius of the magnet 1260 may be formed to be smaller than the diameter of the body 1210, and may be attached to correspond to the concave outer surface of the body 1210, and thus a coupling force can be strengthened.

Further, when the magnet 1260 is coupled to the body 1210 by the bolt 1262 or the like, a fixing force of the magnet 1260 may be increased by filling a space therebeween with a material having an adhesive force. The magnet 1260 can be attached to and detached from a predetermined place in industrial equipment while being included in the measurement unit 1200. As the number of times being attached and detached increases, the durability of the magnet 1260 is necessarily required.

The surface of the sensor line 1241 connected to the first connector 1240 may be waterproofed, and the sensor line 1241 may be connected after or before the cable 1201 is coupled.

The cable 1201 may electrically connect the measurement unit 1200 and a communication unit (not shown) of the IoT sensor to each other, and may be a conductive wire for transmitting and receiving data measured by the sensor.

The cable 1201 may be conceptually distinguished as one structure in the body 1210, but may be a physically distinguished separate element.

When the cable 1201 is a separate element that is physically distinguished from the body 1210, a gap may be formed between the cable 1201 and the body 1210. In order to seal the gap, the packing rubber 1215 may be brought into contact therewith. The packing rubber 1215 may block a fluid path between the cable 1201 and the body 1210 while blocking a fluid path between the cover 1220 and the body 1210.

The cable 1201 may be divided into a measurement unit cable or a communication unit cable by internally dividing a predetermine length of the entire length of the cable 1201. The measurement unit cable and the communication unit cable may be configured to be attachable and detachable. Each of the attachable and detachable cables may be defined as a sub-cable, but is not limited thereto. It is possible to change the type of a sensing unit can be changed while repeatedly using one communication unit, and thus the economical efficiency and the convenience can be improved.

Further, multiple cables 1201 may be provided, and the number of cables may be differently defined depending on the types and the number of sensors.

Figure 27:
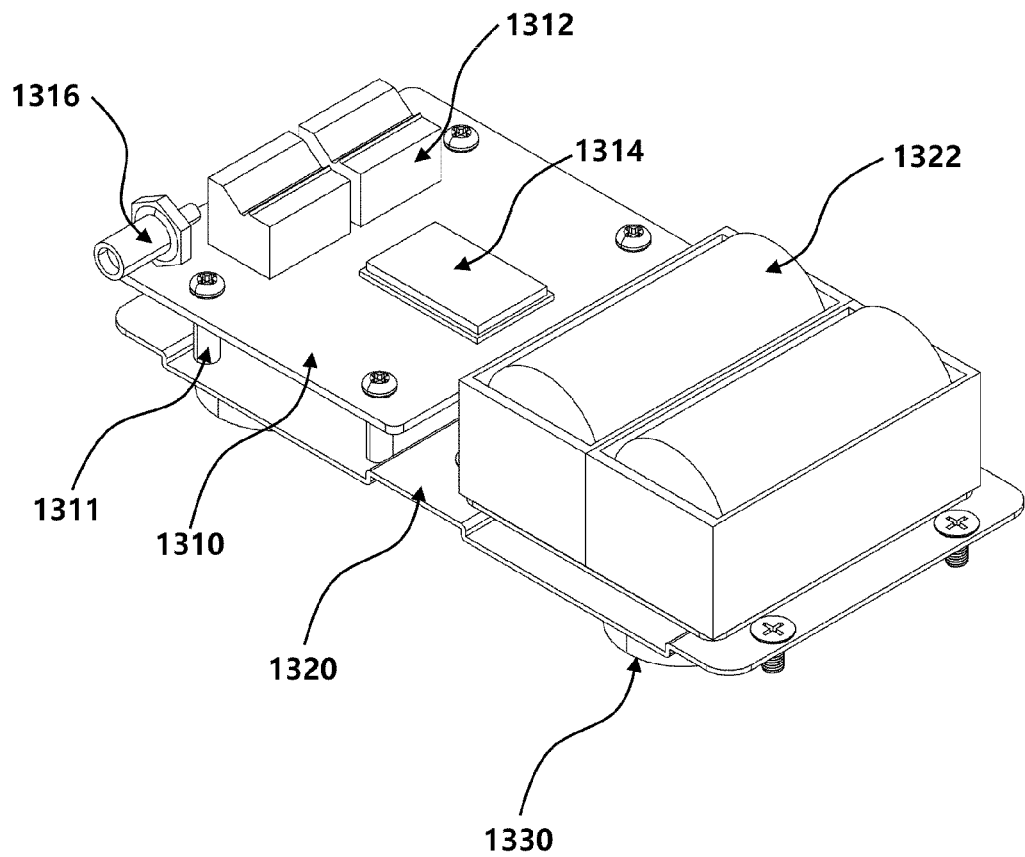
FIG. 27 is a view illustrating a communication unit of an IoT sensor according to an embodiment.

FIG. 27 is a view illustrating a communication unit of an IoT sensor according to an embodiment.

Referring to FIG. 27, a communication unit 1300 of an IoT sensor may include a second substrate 1310, a third substrate 1320, a magnet 1330, etc.

A second connector 1312, a communication module 1314, an antenna 1316, etc. may be disposed on the second substrate 1310.

The second connector 1312 may be an element which is connected to the second substrate 1310 and configured to receive a sensing signal from a measurement unit of the IoT sensor through a cable (not shown).

The signal received by the second connector 1312 may be transferred to the communication module 1314 through the second substrate 1310.

The communication module 1314 may be an element configured to wirelessly communicate with a server (not shown) or the like by using various wireless communication methods and transmit or receive data. At least one of the above-described communication methods may be adopted and used.

The antenna 1316 may be an element which operates in conjunction with the communication module 1314 to generate and transmit a wireless signal or receive a wireless signal.

The third substrate 1320 may be a substrate disposed on a plane that is different from that of the second substrate 1310, and a battery 1322 may be disposed on the third substrate 1320.

According to the prior art, the communication module 1314 and the battery 1322 may be disposed on one substrate, and thus wires are complicated, thereby causing noise of an electrical signal and a problem of an insufficient space of the substrate. For example, in the process of coupling a cover (not shown), an electrical wire may be pressed or cut. Therefore, the above-described problems may be improved by separately disposing multiple substrates and rearranging electrical wires.

For example, the second substrate 1310 and the third substrate 1320 may be disposed on different planes to form multiple layers, and, as illustrated in FIG. 27, the sizes of regions thereof may be adjusted to be different from each other. For example, the size of the second substrate 1310 may be changed to be smaller than the size of the third substrate 1320, thereby forming a space for coupling the battery 1322.

A spacer 1311 may be further included between the second substrate 1310 and the third substrate 1320. The spacer 1311 may provide a coupling force while forming a space between the second substrate 1310 and the third substrate 1320. The spacer 1311 may be coupled to the second substrate 1310 and the third substrate 1320 by a bolt or the like.

The space utilization may be maximized by disposing electrical wires or installing separate components in the space between the second substrate 1310 and the third substrate 1320.

The magnet 1330 may be further disposed on a surface, on which the battery 1322 is not disposed, among surfaces of the third substrate 1320.

The above-described elements of the communication unit 1300 of the IoT sensor may be protected by being isolated from the outside environment by a communication unit case (not shown).

An accident caused by damage or deterioration of industrial equipment can be prevented by performing monitoring through the above-described IoT sensor, for example, a vibration sensor, a temperature sensor, or the like. For example, damage or deterioration of the industrial equipment, caused by breakage of a shaft among elements of the industrial equipment, carbonization of a load side, bearing breakage, motor damage by fire, sleeve damage, grease discoloration, impeller damage, foreign matter inflow, etc., can be prevented by monitoring vibration data and temperature data through the IoT sensor.

The above-described IoT sensor can be used to construct an automatic control system for industrial equipment and reduce the possibility of malfunction of the equipment by initial operation. Further, it is possible to reduce the possibility of malfunction of the equipment, which is caused accidentally or during maintenance or management. Further, the state of the industrial equipment can be monitored in real time by using big data, thereby increasing the lifetime of the industrial equipment and determining and managing a proper replaceable range in real time.

What is claimed is:

1. An Internet-of-Things (IoT) sensor attached to a surface of industrial equipment so as to acquire data, the IoT sensor comprising:
a first substrate;
a first connector electrically connected to the first substrate and attached to a lower surface of the first substrate to transfer a measurement signal of sensors;
a body including a vertical structure configured to support the first substrate;
a measurement unit including a first cover detachably coupled to the body;
a magnetic structure of the measurement unit, having magnetism and attached to an outer surface of the body;
a second connector electrically connected to a second substrate and configured to receive a measurement signal of the sensors;
a communication unit comprising a communication module attached to the second substrate connected to the second connector; and
a cable formed of a flexible conductive wire and having one end connected to the first connector and the other end connected to the second connector
wherein the vertical structure allows a bottom surface of the body and the first substrate to be spaced apart from each other so that both surfaces of the first substrate can be used.

2. The IoT sensor of claim 1,
wherein the communication unit comprises:
a third substrate located on a plane that is different from that of the second substrate;
a second cover detachably coupled to the third substrate;
a battery disposed on one surface of the third substrate and configured to supply power to the communication module disposed on the second substrate; and
a magnetic structure attached to the other surface of the third substrate.

3. The IoT sensor of claim 1, wherein a groove formed in the body and a groove formed in the first cover correspond to each other in shape so as to be brought into contact with each other, and
a silicon-type packing rubber is inserted into a space between the body and the first cover to seal the space.

4. The IoT sensor of claim 1, wherein the magnetic structure is coupled to a concave outer surface of the body by a bolt.

5. The IoT sensor of claim 1, further comprising a vibration sensor disposed on the first substrate so as to acquire vibration data.

6. The IoT sensor of claim 1, further comprising a temperature sensor attached to another surface of the first substrate, on which the first connector is not disposed.

7. The IoT sensor of claim 6, wherein the temperature sensor is connected to a metal line which is attached to the surface of the first substrate by soldering.

8. The IoT sensor of claim 6, wherein the temperature sensor is connected to a metal line detachably coupled to the surface of the first substrate.

9. The IoT sensor of claim 1, wherein the cable comprises multiple detachable sub-cables.

10. The IoT sensor of claim 2,
wherein the communication unit comprises a spacer forming a space between the second substrate and the third substrate, wherein the spacer is coupled to the second substrate and the third substrate by bolts.

11. The IoT sensor of claim 1,
wherein the size of the second substrate is smaller than the size of the third substrate, thereby forming a space for coupling the battery to the third substrate.

12. A system for monitoring industrial equipment from an IoT sensor, the system comprising:
a first server configured to wirelessly receive vibration and temperature data of the industrial equipment from an IoT sensor disposed in the industrial equipment in a first mode and perform monitoring; and
a second server configured to recognize the type of a piece of industrial equipment from an identifier attached to a surface of the industrial equipment in a second mode, and generate and display three-dimensional video data corresponding to the type of the equipment,
wherein the IoT sensor comprises:
a first substrate;
a first connector electrically connected to the first substrate and attached to a lower surface of the first substrate so as to transfer a measurement signal of sensors;
a body including a vertical structure configured to support the first substrate;
a measurement unit including a first cover detachably coupled to the body;
a magnetic structure of the measurement unit, having magnetism and attached to an outer surface of the body;
a second connector electrically connected to a second substrate and configured to receive a measurement signal of the sensors;
a communication unit comprising a communication module attached to the second substrate connected to the second connector; and
a cable formed of a flexible conductive wire and having one end connected to the first connector and the other end connected to the second connector
wherein the vertical structure allows a bottom surface of the body and the first substrate to be spaced apart from each other so that both surfaces of the first substrate can be used.

13. The system of claim 12, wherein the IoT sensor comprises at least one among a temperature sensor, a vibration sensor, and a flow sensor, and
the first server is configured to receive measured data, measured by the temperature sensor, the vibration sensor, or the flow sensor, by an LORA communication or Wi-Fi communication method through a wireless communication sensor.

14. The system of claim 12, wherein the system is configured to perform a step of displaying, based on augmented reality, information about the industrial equipment in the second mode, and
the second server is configured to perform:
a step of receiving image data of the equipment or data about an identifier attached to the equipment sensed by a camera included in a user's terminal;
a step of comparing the data about the identifier with a list of the types of multiple pieces of equipment, stored in the second server, to determine the type of the equipment;
a step of generating three-dimensional video data that corresponds to the type of the equipment and comprises information about a shape and a size of the equipment; and
a step of transferring the three-dimensional video data to the user's terminal.

15. The system of claim 12, wherein the equipment comprises a pump or a motor, and the identifier comprises QR code or bar code information.

16. The system of claim 12, wherein the second server is configured to perform a step of processing the three-dimensional video data such that the three-dimensional video data corresponds to a specific position of a real image of the equipment.

17. The system of claim 12, wherein data comprising information about a specification or a function of the equipment is transmitted to a user's terminal, based on an input of the user.

18. The system of claim 12, wherein the second server is configured to perform:
   a step of analyzing image data of the equipment, an image of which is captured through the camera of a user's terminal; and
   a step of transmitting, to the user's terminal, augmented reality data of the equipment which is generated by a combination of the analyzed image data and the three-dimensional video data.

19. The system of claim 12, wherein the second server is configured to perform a step of receiving touch input data comprising information about a position of a touch of the user from a user's terminal, and transmitting animation data stored in the second server to the user's terminal when the position of the touch of the user is included in a region for displaying an animation operation menu.

* * * * *